US010168666B2

(12) United States Patent
Ishii et al.

(10) Patent No.: US 10,168,666 B2
(45) Date of Patent: Jan. 1, 2019

(54) IMAGE FORMING APPARATUS

(71) Applicant: FUJI XEROX CO., LTD., Tokyo (JP)

(72) Inventors: Kazunari Ishii, Kanagawa (JP); Akio Shimonaga, Kanagawa (JP); Masayuki Yamagishi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/672,390

(22) Filed: Aug. 9, 2017

(65) Prior Publication Data

US 2018/0101132 A1 Apr. 12, 2018

(30) Foreign Application Priority Data

Oct. 12, 2016 (JP) ................................ 2016-200631

(51) Int. Cl.

*G02B 26/10* (2006.01)
*G03G 21/12* (2006.01)
*G03G 21/20* (2006.01)
*B41J 29/377* (2006.01)
*G03G 21/16* (2006.01)

(52) U.S. Cl.

CPC .......... *G03G 21/206* (2013.01); *B41J 29/377* (2013.01); *G03G 21/12* (2013.01); *G03G 21/169* (2013.01); *G03G 21/1619* (2013.01); *G03G 21/1685* (2013.01)

(58) Field of Classification Search

CPC .. G03G 21/206; G03G 21/12; G03G 21/1619; G03G 21/1685; G03G 21/169

See application file for complete search history.

(56) References Cited

U.S. PATENT DOCUMENTS 8,437,653 B2 * 5/2013 Brown ................. G03D 13/006 399/92
2008/0138133 A1 * 6/2008 Hatayama .............. G03G 21/12 399/360
2018/0011441 A1 * 1/2018 Ueno .................. G03G 15/095

FOREIGN PATENT DOCUMENTS

JP 2001-138574 A 5/2001
JP 2006-079014 A 3/2006

* cited by examiner

*Primary Examiner* — David M. Gray
*Assistant Examiner* — Michael A Harrison
(74) *Attorney, Agent, or Firm* — Sughrue Mion, PLLC

(57) ABSTRACT

An image forming apparatus includes an image forming portion, a waste toner housing container, an open/close member, and an air blowing unit. The image forming portion forms an image. The waste toner housing container is disposed on one side surface of the image forming portion to house a waste toner discharged from the image forming portion. The open/close member opens and closes an opening portion provided in a side surface of an apparatus body to mount and remove the waste toner housing container. The air blowing unit is provided close to the waste toner housing container on a side surface of the apparatus body that is adjacent to a side surface on which the open/close member is installed. The air blowing unit feeds air to the image forming portion from a side of the waste toner housing container toward an opposite side.

7 Claims, 27 Drawing Sheets

IMAGE FORMING APPARATUS

CROSS-REFERENCE TO RELATED APPLICATIONS

This application is based on and claims priority under 35 USC 119 from Japanese Patent Application No. 2016-200631 filed Oct. 12, 2016.

BACKGROUND

Technical Field

The present invention relates to an image forming apparatus.

SUMMARY

According to an aspect of the present invention, there is provided an image forming apparatus including: an image forming portion that forms an image; a waste toner housing container disposed on one side surface of the image forming portion to house a waste toner discharged from the image forming portion; an open/close member that opens and closes an opening portion provided in a side surface of an apparatus body to mount and remove the waste toner housing container; and an air blowing unit provided close to the waste toner housing container on a side surface of the apparatus body that is adjacent to a side surface on which the open/close member is installed, the air blowing unit feeding air to the image forming portion from a side of the waste toner housing container toward an opposite side.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

First Exemplary Embodiment

Figure 1:
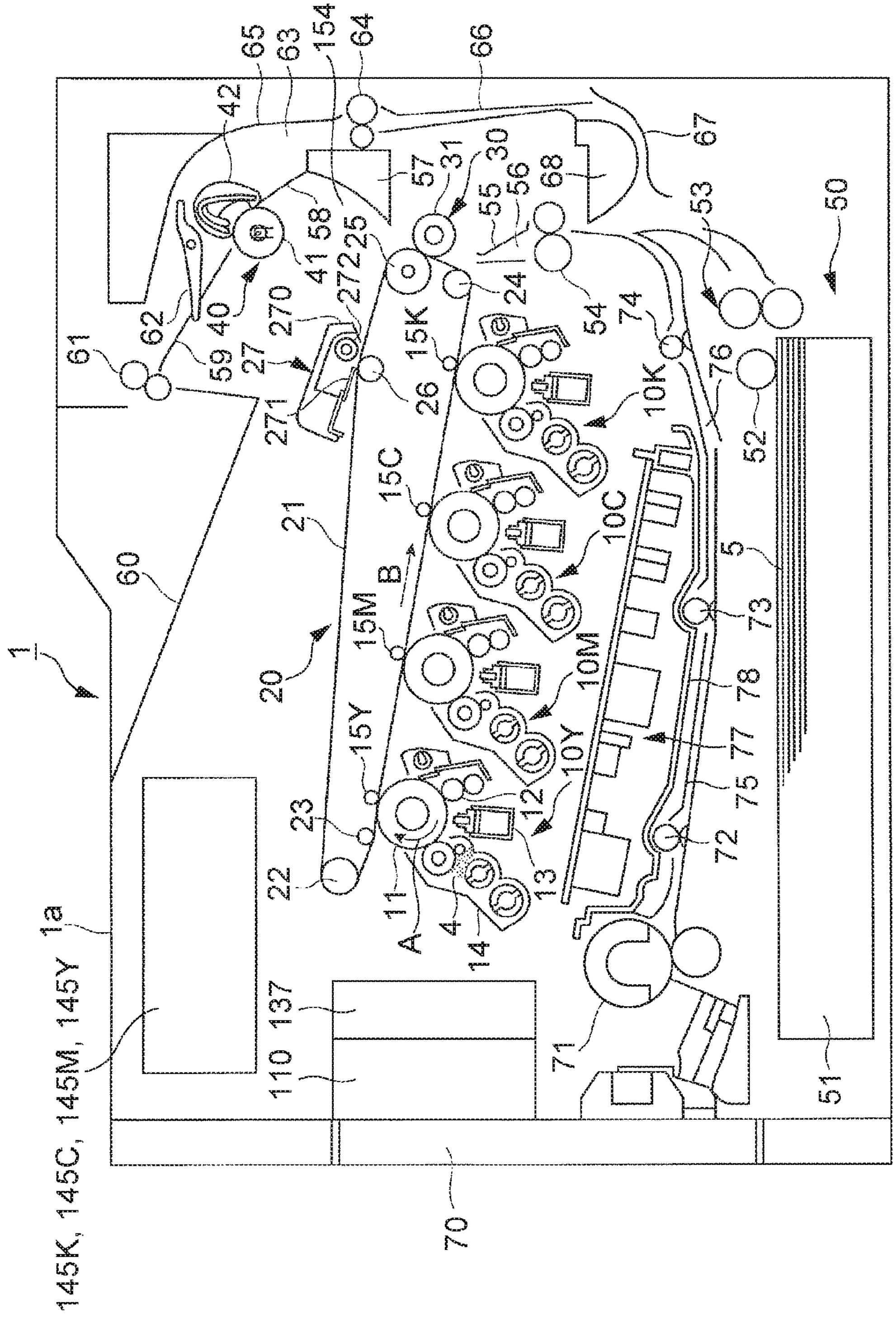
FIG. 1 illustrates the overall configuration of an image forming apparatus according to a first exemplary embodiment of the present invention.
Figure 2:
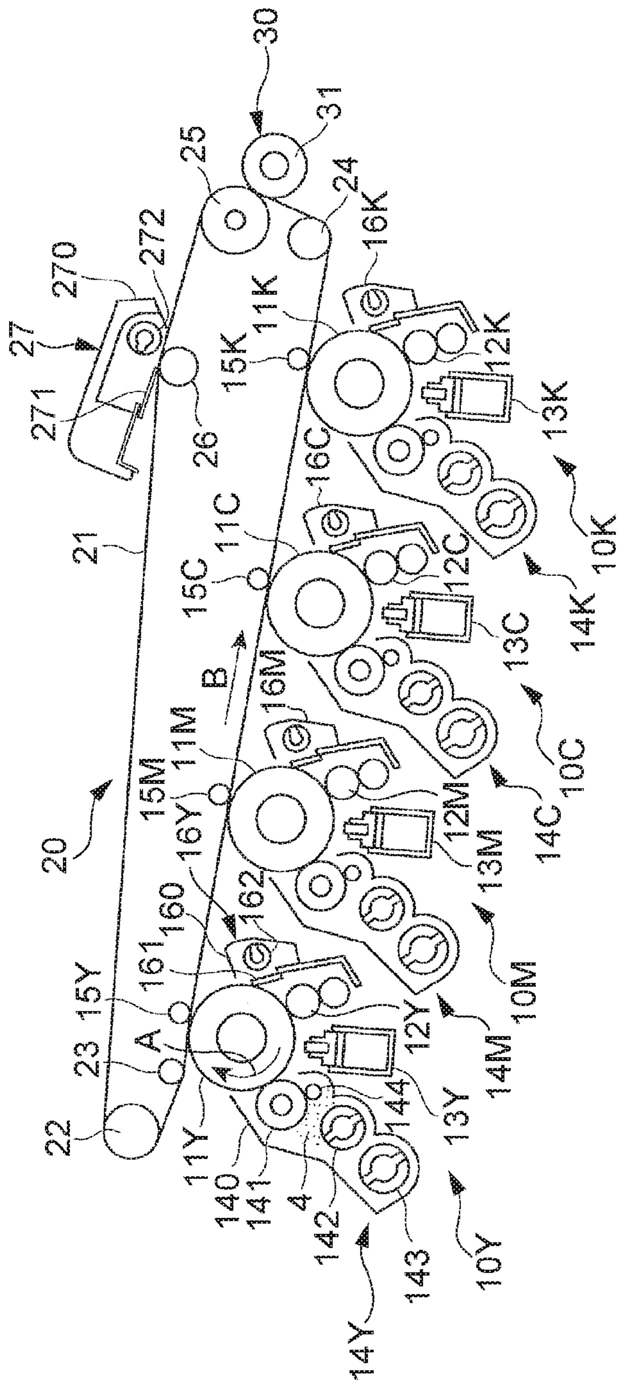
FIG. 2 illustrates the configuration of an image forming portion of the image forming apparatus according to the first exemplary embodiment of the present invention.

FIG. 1 illustrates an overview of the entire image forming apparatus according to a first exemplary embodiment of the present invention. FIG. 2 illustrates a particular portion (such as image preparing devices) of the image forming apparatus as enlarged.

<Overall Configuration of Image Forming Apparatus>

An image forming apparatus 1 according to the first exemplary embodiment is configured as a color printer, for example. The image forming apparatus 1 includes plural image preparing devices 10, an intermediate transfer device 20, a paper feed device 50, a fixing device 40, and so forth. The image preparing devices 10 are an example of image preparing units that form a toner image to be developed using a toner that serves as a developer 4. The intermediate transfer device 20 holds the toner images formed by the image preparing devices 10 to transport the toner images finally to a second transfer position at which the toner images are subjected to a second transfer performed onto recording paper 5 that serves as an example of a recording medium. The paper feed device 50 stores and transports the prescribed recording paper 5 to be supplied to the second transfer position of the intermediate transfer device 20. The fixing device 40 fixes the toner images on the recording paper 5 which have been subjected to the second transfer performed by the intermediate transfer device 20. The image preparing devices 10 and the intermediate transfer device 20 constitute an image forming portion. In the drawing, reference symbol 1*a* denotes an apparatus body of the image forming apparatus 1. The apparatus body 1*a* is formed from a support structure member, an outer covering, and so forth.

The image preparing devices 10 are composed of four image preparing devices 10Y, 10M, 10C, and 10K that exclusively form toner images in four colors, namely yellow (Y), magenta (M), cyan (C), and black (K), respectively. The four image preparing devices 10 (Y, M, C, K) are disposed side by side in line as inclined in the internal space of the apparatus body 1*a*. Of the four image preparing devices 10 (Y, M, C, K), the image preparing device 10Y for yellow (Y) is provided at a relatively high position along the vertical direction, and the image preparing device 10K for black (K) is provided at a relatively low position.

As illustrated in FIGS. 1 and 2, the image preparing devices 10 (Y, M, C, K) each include a photosensitive drum 11 that is rotatable as an example of an image holding member. The following devices that serve as an example of a toner image forming unit are disposed around the photosensitive drum 11. The devices include a charging device 12, an exposure device 13, a developing device 14 (Y, M, C, K), a first transfer device 15 (Y, M, C, K), a drum cleaning device 16 (Y, M, C, K), and so forth. The charging device 12 charges a peripheral surface (image holding surface) of the photosensitive drum 11, on which an image may be formed, with a prescribed potential. The exposure device 13 radiates light based on information (signal) on an image to the charged peripheral surface of the photosensitive drum 11 to form an electrostatic latent image (in each color) with a potential difference. The developing device 14 (Y, M, C, K) develops the electrostatic latent image using a toner of the developer 4 for the corresponding color (Y, M, C, K) to form a toner image. The first transfer device 15 (Y, M, C, K) serves as an example of a first transfer unit that transfers the toner image to the intermediate transfer device 20. The drum cleaning device 16 (Y, M, C, K) removes attached matter such as a toner remaining on and adhering to the image holding surface of the photosensitive drum 11 after being subjected to the first transfer to clean the photosensitive drum 11.

The photosensitive drum 11 has an image holding surface formed by providing a photoconductive layer (photosensitive layer) made of a photosensitive material on the peripheral surface of a grounded cylindrical or columnar base material. The photosensitive drum 11 is supported so as to receive power from a drive device (not illustrated) to rotate in the direction indicated by the arrow A.

The charging device 12 is configured as a contact charging roller disposed in contact with the photosensitive drum 11. A charging voltage is supplied to the charging device 12. In the case where the developing device 14 performs reversal development, a voltage or a current having the same polarity as the polarity for charging the toner supplied from the developing device 14 is supplied as the charging voltage. A non-contact charging device such as a scorotron disposed without contact with the surface of the photosensitive drum 11 may be used as the charging device 12.

The exposure device 13 radiates the light, formed in accordance with the information on the image input to the image forming apparatus 1, toward the peripheral surface of the photosensitive drum 11 after being charged to form an electrostatic latent image. When a latent image is to be formed, information (signal) on the image input in any manner to the image forming apparatus 1 is transmitted to the exposure device 13.

The exposure device 13 is constituted of a light emitting diode (LED) print head that radiates light according to image information to the photosensitive drum 11 using plural LEDs that serve as light emitting elements arranged along the axial direction of the photosensitive drum 11 to form an electrostatic latent image. In the exposure device 13, deflection scanning may be performed along the axial direction of the photosensitive drum 11 using laser light configured in accordance with the image information.

Figure 3:
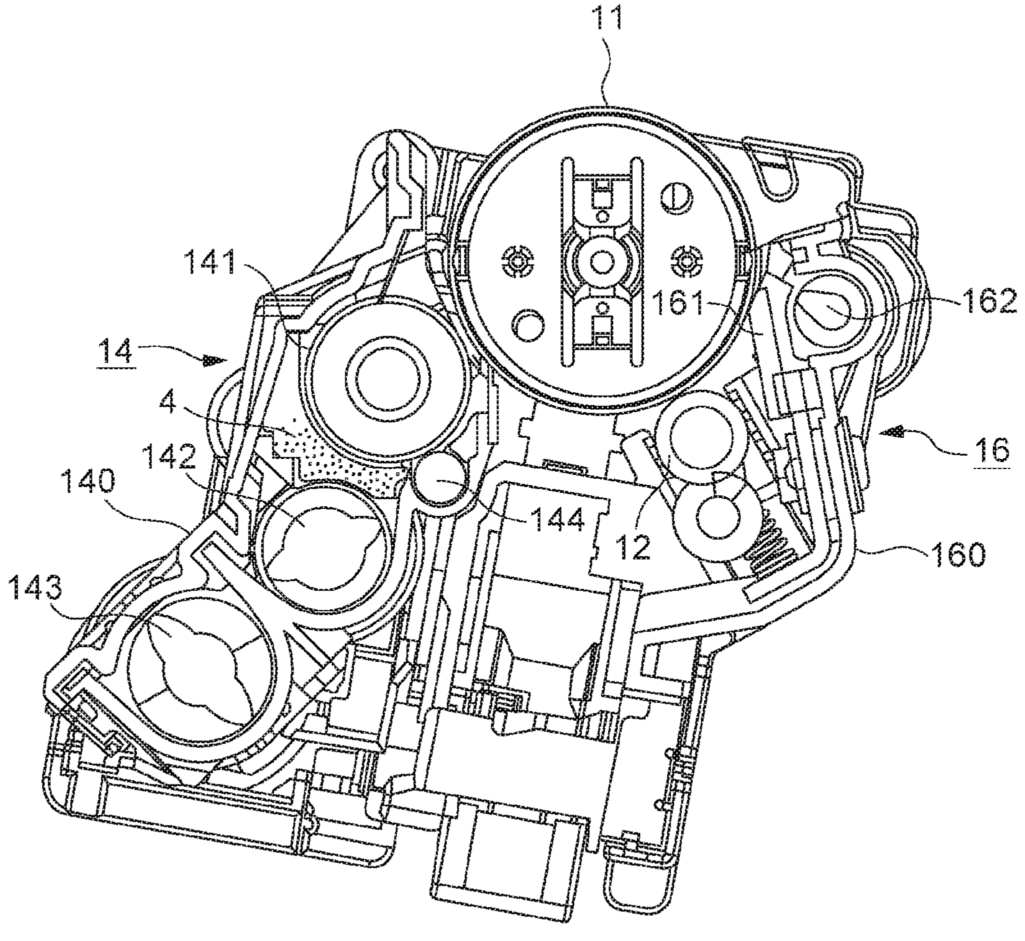
FIG. 3 is a sectional view illustrating the configuration of a process cartridge.

As illustrated in FIGS. 2 and 3, the developing devices 14 (Y, M, C, K) each include a housing 140, a developing roller 141, agitation/transport members 142 and 143, a layer thickness restricting member 144, and so forth. The housing 140 includes an opening portion and a storing chamber for the developer 4, and houses the other components. The developing roller 141 holds the developer 4, and transports the developer 4 to a development region facing the photosensitive drum 11. The agitation/transport members 142 and 143, which may be two screw augers, transport the developer 4 to cause the developer 4 to pass through the developing roller 141 while agitating the developer 4. The layer thickness restricting member 144 restricts the amount (layer thickness) of the developer held by the developing roller 141. A development voltage supplied from a power source device (not illustrated) is applied between the developing roller 141 of the developing device 14 and the photosensitive drum 11. In addition, power from a drive device (not illustrated) is transmitted to the developing roller 141 and the agitation/transport members 142 and 143 to rotate the developing roller 141 and the agitation/transport members 142 and 143 in a prescribed direction. Further, a two-component developer containing a non-magnetic toner and a magnetic carrier is used as the developers 4 (Y, M, C, K) for the four colors.

The first transfer device 15 (Y, M, C, K) is a contact transfer device that includes a first transfer roller that rotates in contact with the periphery of the photosensitive drum 11 via an intermediate transfer belt 21 and that is supplied with a first transfer voltage. A DC voltage having a polarity opposite to the polarity for charging the toner is supplied from a power source device (not illustrated) as the first transfer voltage.

As illustrated in FIGS. 2 and 3, the drum cleaning device 16 includes a body 160, a cleaning plate 161, a feeding member 162, and so forth. The body 160 has the shape of a partially open container that covers a region extending to a location below the charging device 12. The cleaning plate 161 is disposed so as to contact the peripheral surface of the photosensitive drum 11, after being subjected to the first transfer, with a prescribed pressure to clean the photosensitive drum 11 by removing attached matter such as a residual toner. The feeding member 162, which may be a screw auger, recovers attached matter, such as a toner, removed by the cleaning plate 161 to feed the attached matter to a recovery system (not illustrated). A plate-like member (for example, a blade) made of a material such as rubber is used as the cleaning plate 161.

As illustrated in FIG. 1, the intermediate transfer device 20 is disposed at a position above the image preparing devices 10 (Y, M, C, K). The intermediate transfer device 20 is principally composed of the intermediate transfer belt 21, plural belt support rollers 22 to 26, a second transfer device 30, and a belt cleaning device 27. The intermediate transfer belt 21 rotates in the direction indicated by the arrow B while passing through first transfer positions between the photosensitive drums 11 and the first transfer devices 15 (first transfer rollers). The belt support rollers 22 to 26 rotatably support the intermediate transfer belt 21 by holding the intermediate transfer belt 21 in a desired state from the inner side. The second transfer device 30 serves as an example of a second transfer member disposed on the side of the outer peripheral surface (image holding surface) of the intermediate transfer belt 21 supported by the belt support roller 25 to transfer the toner image on the intermediate transfer belt 21 to the recording paper 5 through a second transfer. The belt cleaning device 27 cleans the intermediate transfer belt 21 by removing attached matter such as a toner and paper powder remaining on and adhering to the outer peripheral surface of the intermediate transfer belt 21 after passing through the second transfer device 30.

An endless belt fabricated from a material obtained by dispersing a resistance adjusting agent such as carbon black etc. in a synthetic resin such as a polyimide resin or a polyamide resin, for example, is used as the intermediate transfer belt 21. The belt support roller 22 is configured as a driving roller rotationally driven by a drive device (not illustrated). The belt support roller 23 is configured as a driven roller that maintains the travel position etc. of the intermediate transfer belt 21. The belt support roller 24 is configured as a tension applying roller that applies tension to the intermediate transfer belt 21. The belt support roller 25 is configured as a second transfer back-up roller. The belt support roller 26 is configured as a support roller that supports the back surface of the intermediate transfer belt 21 cleaned by the belt cleaning device 27.

As illustrated in FIG. 1, the second transfer device 30 is a contact transfer device that includes a second transfer roller 31 provided at the second transfer position, which is a portion of the outer peripheral surface of the intermediate transfer belt 21 supported by the belt support roller 25 in the intermediate transfer device 20. The second transfer roller 31 rotates in contact with the peripheral surface of the intermediate transfer belt 21, and is supplied with a second transfer voltage. A DC voltage having a polarity opposite to or the same as the polarity for charging the toner is supplied as the second transfer voltage to the second transfer roller 31 or the belt support roller 25 of the intermediate transfer device 20.

As illustrated in FIG. 2, the belt cleaning device 27 is configured similarly to the drum cleaning device 16, and includes a body 270, a cleaning plate 271, a feeding member 272, and so forth. The body 270 has the shape of a partially open container. The cleaning plate 271 is disposed so as to contact the peripheral surface of the intermediate transfer belt 21, after being subjected to the second transfer, with a prescribed pressure to clean the intermediate transfer belt 21 by removing attached matter such as a residual toner. The feeding member 272, which may be a screw auger, recovers attached matter, such as a toner, removed by the cleaning plate 271 to feed the attached matter to a recovery system (not illustrated). A plate-like member (for example, a blade) made of a material such as rubber is used as the cleaning plate 271.

The fixing device 40 is composed of a heating rotary member 41, a pressurizing rotary member 42, and so forth. The heating rotary member 41, which may be in the form of a roller or a belt, is heated by a heating unit such that the surface temperature is maintained at a prescribed temperature. The pressurizing rotary member 42, which may be in the form of a belt or a roller, rotates in contact with the heating rotary member 41 at a predetermined pressure in the state of being substantially parallel to the axial direction of the heating rotary member 41. In the fixing device 40, a contact portion at which the heating rotary member 41 and the pressurizing rotary member 42 contact each other serves as a fixation processing part at which a prescribed fixation process (heating and pressurization) is performed.

The paper feed device 50 is disposed at a position below the image preparing devices 10 (Y, M, C, K) for yellow (Y), magenta (M), cyan (C), and black (K). The paper feed device 50 is principally composed of one or more paper storing members 51 and feeding devices 52 and 53. The paper storing members 51 store a stack of sheets of the recording paper 5 of desired size, type, etc. The feeding devices 52 and 53 feed the recording paper 5, one sheet at a time, from the paper storing members 51. The paper storing members 51 are attached so as to be drawn out toward the front surface, which is a surface that the user faces during operation, of the apparatus body 1*a* (the left side surface in the illustrated example), for example.

Examples of the recording paper 5 include regular paper and overhead projector (OHP) sheets for use for electrophotographic copiers and printers. In order to further improve the smoothness of the surface of an image after being fixed, the surface of the recording paper 5 is preferably as smooth as possible. For example, coated paper prepared by coating the surface of regular paper with a resin or the like, so-called cardboard with a relatively large basis weight such as art paper for printing, and so forth may also be used.

A paper feed/transport path 56 is provided between the paper feed device 50 and the second transfer device 30. The paper feed/transport path 56 is composed of one or more pairs of paper transport rollers 54, a transport guide 55, and so forth. The pair of paper transport rollers 54 transport the recording paper 5 fed from the paper feed device 50 to the second transfer position. The pair of paper transport rollers 54 are configured as rollers (resist rollers) that adjust the timing to transport the recording paper 5, for example. Transport guides 57 and 58 etc. are provided between the second transfer device 30 and the fixing device 40. The transport guides 57 and 58 transport the recording paper 5 after being subjected to the second transfer fed from the second transfer roller 31 of the second transfer device 30 to the fixing device 40. Further, a pair of paper ejection rollers 61 are disposed near a paper ejection port of the apparatus body 1*a*. The pair of paper ejection rollers 61 eject the recording paper 5 after being fixed fed from the fixing device 40 to a paper ejection portion 60 provided at the upper portion of the apparatus body 1*a* along a transport guide 59.

A switching gate 62 that switches the paper transport path is provided between the fixing device 40 and the pair of paper ejection rollers 61. The rotational direction of the pair of paper ejection rollers 61 is switchable between the forward direction (ejection direction) and the reverse direction. In the case where an image is to be formed on both surfaces of the recording paper 5, the rotational direction of the pair of paper ejection rollers 61 is switched from the forward direction (ejection direction) to the reverse direction after the rear end of the recording paper 5, on one surface of which an image has been formed, passes through the switching gate 62. The transport path of the recording paper 5 which is transported in the reverse direction by the pair of paper ejection rollers 61 is switched by the switching gate 62 such that the recording paper 5 is transported to a two-sided printing transport path 63 formed along substantially the vertical direction on a side surface of the apparatus body 1*a*.

The two-sided printing transport path 63 includes a pair of paper transport rollers 64, transport guides 65 to 68, and so forth. The pair of paper transport rollers 64 transport the recording paper 5 to the pair of paper transport rollers 54 with the front and back sides of the recording paper 5 reversed.

In FIG. 1, reference numeral 70 denotes a manual feed tray provided on the front surface (in the drawing, left side surface) of the apparatus body 1*a* so as to be openable and closable about the lower end portion of the front surface. A feeding device 71 and a manual feed paper transport path 76 are provided between the manual feed tray 70 and the pair of paper transport rollers 54. The feeding device 71 feeds the recording paper 5 housed in the manual feed tray 70, one sheet at a time. The manual feed paper transport path 76 is composed of plural pairs of paper transport rollers 72 to 74, a transport guide 75, and so forth.

A high-voltage power source device 77 is disposed between the manual feed paper transport path 76 and the image preparing devices 10 (Y, M, C, K) for yellow (Y), magenta (M), cyan (C), and black (K). The high-voltage power source device 77 is constituted of electrical elements such as a step-up transformer that supplies a high voltage to the image preparing devices 10 (Y, M, C, K) and a capacitor. A plate-like air guiding member 78 is provided below the high-voltage power source device 77 so as to extend along the transport direction of the manual feed paper transport path 76. The air guiding member 78 prevents, or suppresses, an air flow fed from an air blowing fan from flowing to the manual feed paper transport path 76, and guides the air flow to flow along the high-voltage power source device 77.

In FIG. 1, reference numeral 145 (Y, M, C, K) denotes each of plural toner cartridges that serve as an example of developer storing containers that are arranged along a direction orthogonal to the sheet surface and that store a developer containing at least a toner to be supplied to the corresponding developing devices 14 (Y, M, C, K).

<Configuration of Process Cartridge>

In the exemplary embodiment, image forming members such as the photosensitive drum 11 and the charging device 12, the developing device 14, and the drum cleaning device 16 disposed around the photosensitive drum 11 are integrally unitized and assembled to each other to compose a process cartridge 80 that serves as an example of an image forming unit. The exposure device 13 is independently unitized separately from the process cartridge 80.

Figure 4:
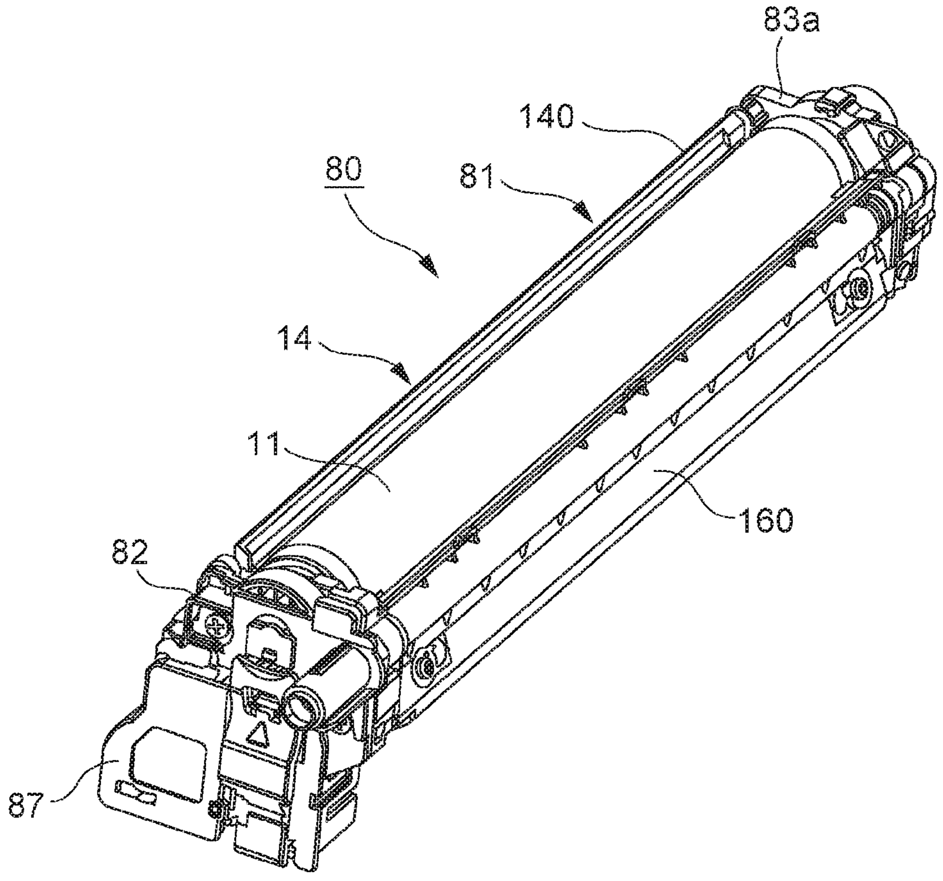
FIG. 4 is a perspective view illustrating the configuration of the process cartridge.
Figure 5:
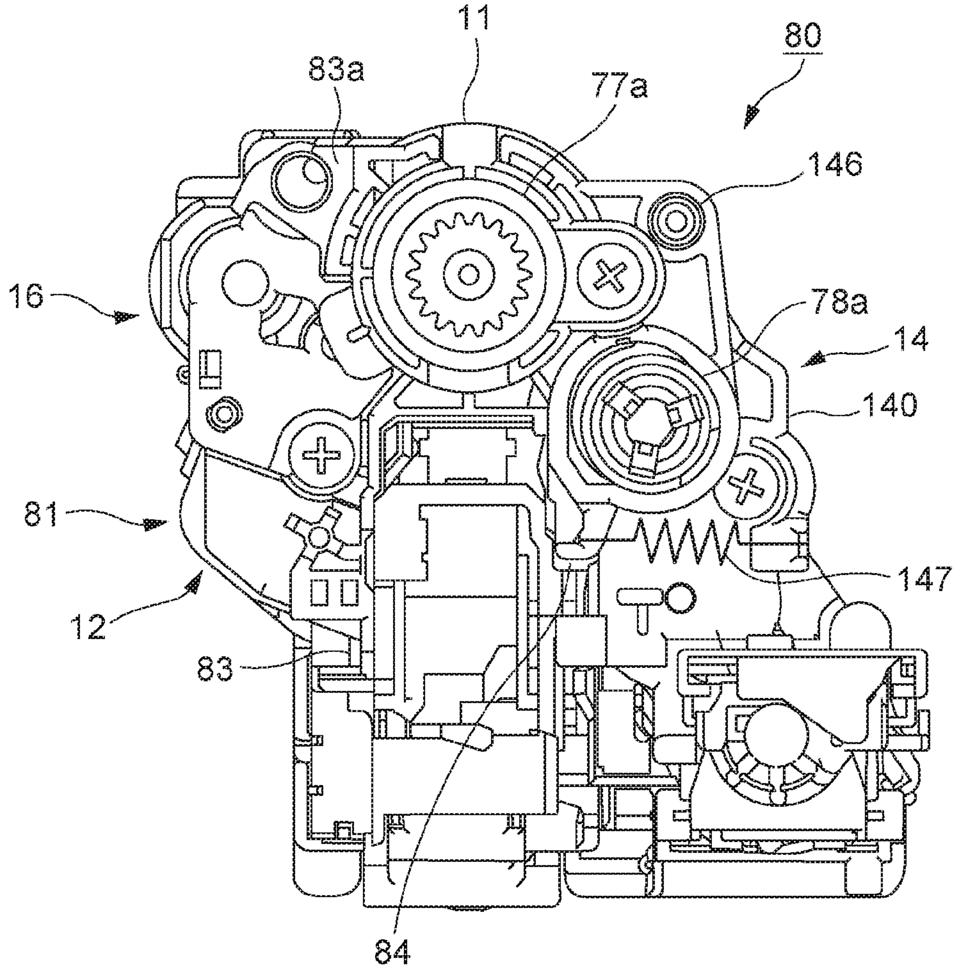
FIG. 5 is a back view illustrating the process cartridge.
Figure 6:
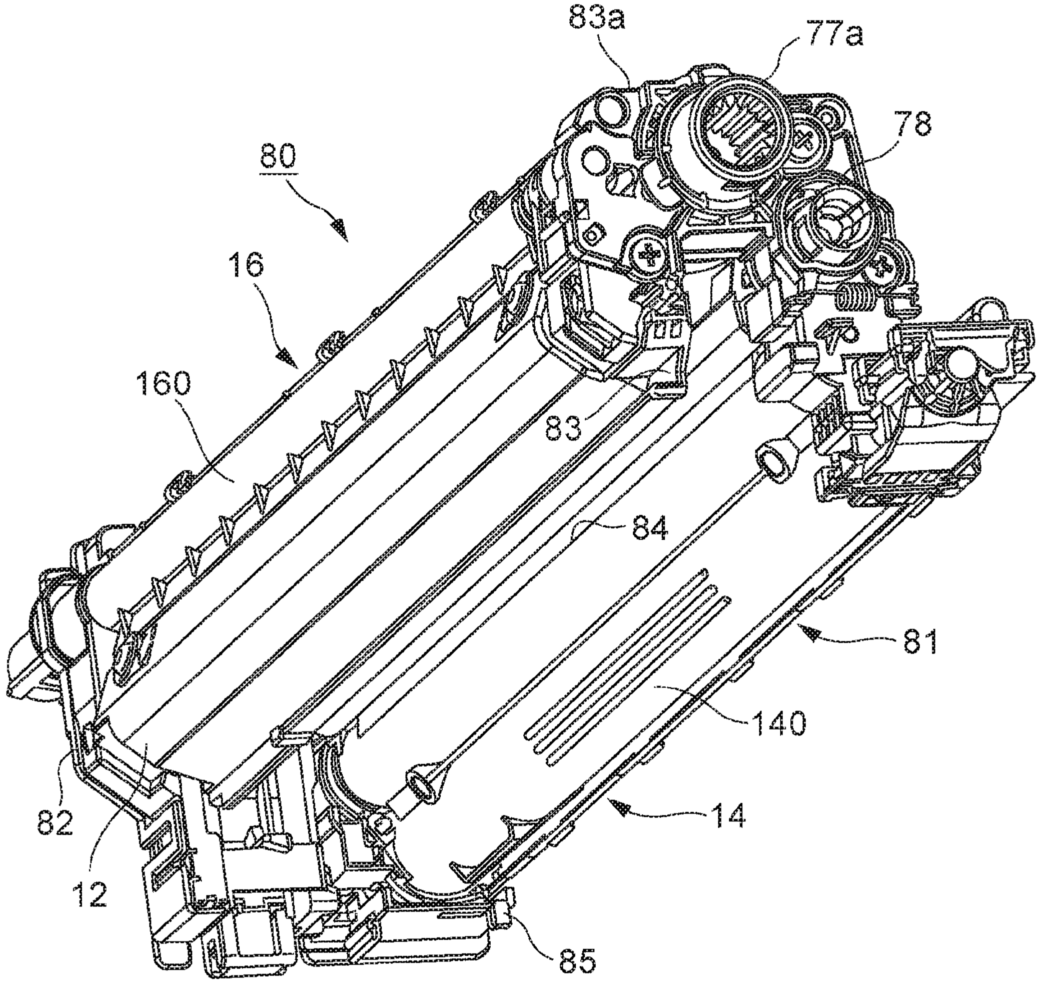
FIG. 6 is a perspective view illustrating the configuration of the process cartridge.

FIG. 4 is a perspective view illustrating the appearance of the process cartridge 80 as seen from obliquely above on the front side along the mount direction. FIG. 5 is a side view of the process cartridge 80 as seen from the distal end side (back side) along the mount direction. FIG. 6 is a perspective view illustrating the appearance of the process cartridge 80 as seen from obliquely below on the back side along the mount direction.

As illustrated in FIGS. 4 to 6, the process cartridge 80 includes a process cartridge body 81 that serves as an example of an image forming unit body to which the photosensitive drum 11, the charging device 12, the developing device 14, and the drum cleaning device 16 which have been integrally unitized are mounted. In the illustrated exemplary embodiment, the process cartridge body 81 is composed of the housing 140 of the developing device 14, a body 160 of the drum cleaning device 16, frame members 82 and 83*a* disposed at end portions on the front and back sides, respectively, along the mount direction, and so forth.

The photosensitive drum 11 is rotatably mounted to the frame members 82 and 83*a* of the process cartridge body 81. As illustrated in FIG. 5, meanwhile, the developing device 14 is attached so as to be swingable with respect to the process cartridge body 81 about a swing fulcrum 146 in such a direction that the developing roller 141 is brought into and out of contact with the photosensitive drum 11. In addition, the developing device 14 is configured such that tracking rollers (not illustrated) that serve as gap setting members disposed at both end portions of the developing roller 141 along the axial direction are caused to abut against the surface of the photosensitive drum 11 by an elastic member 147. The elastic member 147, which may be a coil spring, is provided to extend between the housing 140 of the developing device 14 and the frame members 82 and 83*a* of the process cartridge body 81 to which the photosensitive drum 11 is rotatably mounted. With such a configuration, the gap (so-called DRS) between the photosensitive drum 11 and the developing roller 141 is set to a prescribed value with high accuracy. As illustrated in FIGS. 5 and 6, a first drive force transmission portion 77*a* and a second drive force transmission portion 78*a* are provided to project from an end surface of the process cartridge 80 on the distal end side along the mount direction. The first drive force transmission portion 77*a* transmits a drive force to the photosensitive drum 11. The second drive force transmission portion 78*a* transmits a drive force to the developing roller 141.

Figure 7A:
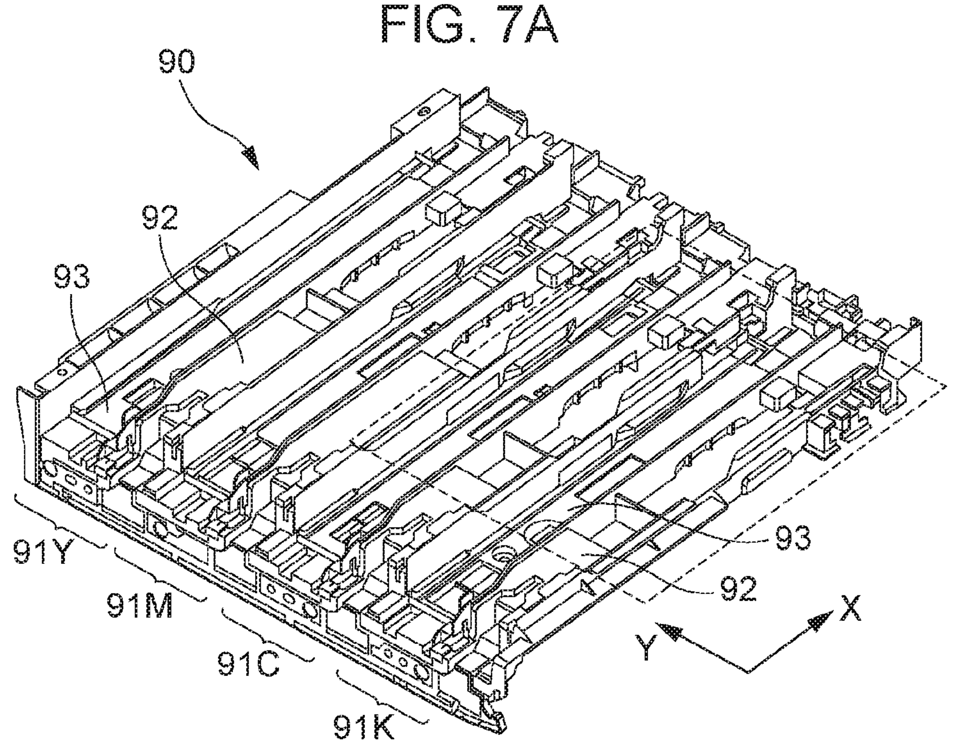
FIGS. 7A and 7B are each a perspective view illustrating the configuration of a mount portion for process cartridges.
Figure 7B:
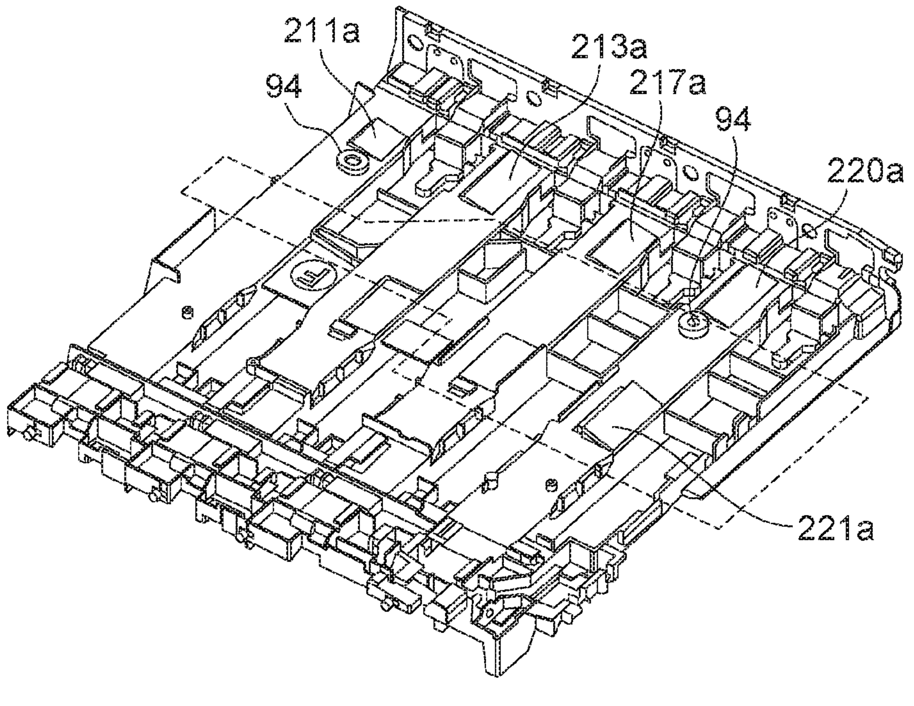
Figure 8:
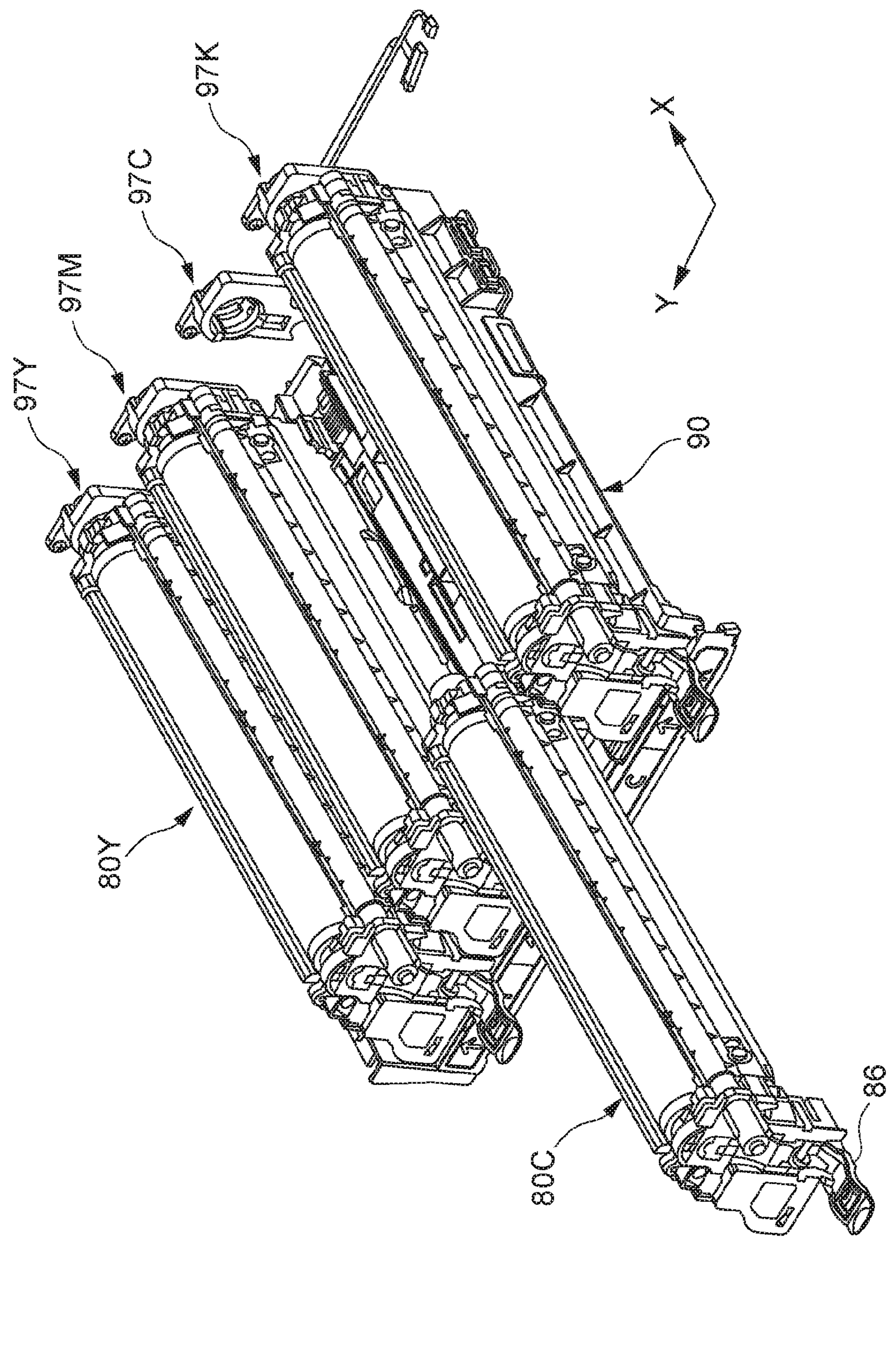
FIG. 8 is a perspective view illustrating a state in which the process cartridges are mounted.

As illustrated in FIGS. 7A, 7B, and 8, the process cartridge 80 is removably mounted to a unit mount member 90, which serves as an example of a second guide member provided to the image forming apparatus body 1*a*, along the axial direction (X direction) of the photosensitive drum 11.

The unit mount member 90 is disposed inside the apparatus body 1*a* so as to be provided below the image preparing devices 10 (Y, M, C, K) for yellow (Y), magenta (M), cyan (C), and black (K) and above the high-voltage power source device 77. As illustrated in FIGS. 7A and 7B, the unit mount member 90 includes four cartridge support portions 91 (Y, M, C, K) that correspond to the process cartridges 80 (Y, M, C, K) for yellow (Y), magenta (M), cyan (C), and black (K) and that extend along the width direction (Y direction) with respect to the front surface of the apparatus body 1*a*. As illustrated in FIG. 1, the image preparing devices 10 (Y, M, C, K) which are composed of the process cartridges 80 (Y, M, C, K) etc. are disposed as inclined such that the yellow (Y) side is relatively high and the black (K) side is relatively low. Therefore, as with the image preparing devices 10 (Y, M, C, K), the four cartridge support portions 91 (Y, M, C, K) are disposed as inclined such that the side of the cartridge support portion 91Y for yellow (Y) is relatively high and the side of the cartridge support portion 91K for black (K) is relatively low.

The four cartridge support portions 91 (Y, M, C, K) are basically configured in the same manner as each other. As illustrated in FIG. 7A, the cartridge support portion 91 includes a mount platform 92 and a guide surface 93. The mount platform 92 is formed in the shape of a platform that is one level higher to allow mounting of the exposure device 13 which is unitized separately from the process cartridge 80. The guide surface 93 is provided in a recessed shape adjacently at a side (left side of the drawing) of the mount platform 92 along the width direction (Y direction) which crosses the mount direction (X direction) of the process cartridge 80, and guides the bottom surface, which corresponds to the developing device 14, of the process cartridge 80 to be removably mounted.

Figure 9:
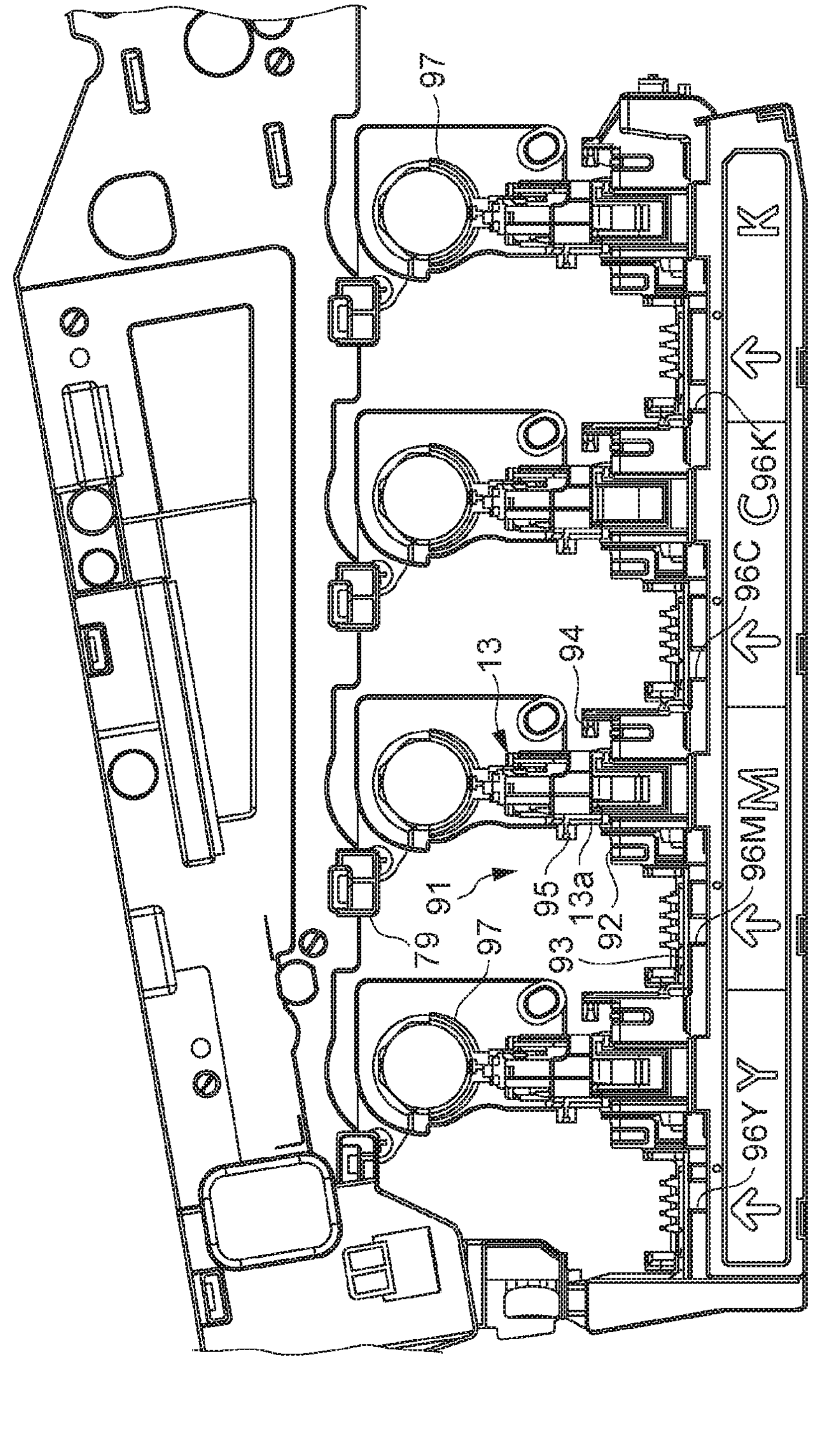
FIG. 9 is a front view illustrating the mount portion for the process cartridges.

As illustrated in FIG. 9, in addition, the cartridge support portion 91 includes a first guide portion 94 and a second guide portion 95. The first guide portion 94 is provided at one end portion of the mount platform 92 along the width direction (Y direction) which crosses the mount direction (X direction) of the process cartridge 80 to project upward in an inverted L shape. The second guide portion 95 is a projected portion that projects from a side surface of a housing 13*a* of the unitized exposure device 13 mounted to the mount platform 92.

As illustrated in FIGS. 5 and 6, the process cartridge 80 includes a recessed portion 83 provided at the lower end portion of the charging device 12, and a recessed portion 84 provided in the inner side surface of the developing device 14. The first guide portion 94 of the cartridge support portion 91 is inserted into the recessed portion 83. The second guide portion 95 of the cartridge support portion 91 is inserted into the recessed portion 84. The lower end surface of the developing device 14 of the process cartridge 80 is guided by the guide surface 93 of the cartridge support portion 91.

As illustrated in FIG. 9, in addition, a recessed portion 96 is provided at an end portion of the cartridge support portion 91 on the front side along the mount direction (X direction) of the process cartridge 80. The recessed portion 96 has a non-compatible shape to enable only the process cartridge 80 for the corresponding color to be mounted to the cartridge support portion 91 in order to prevent the process cartridge 80 from being mounted to a wrong cartridge support portion 91. The recessed portion 96 in a non-compatible shape is different in position along the width direction (Y direction) which crosses the mount direction (X direction) for each of the process cartridges 80 (Y, M, C, K) for yellow (Y), magenta (M), cyan (C), and black (K). As illustrated in FIG. 6, meanwhile, a projected portion 85 is provided on the bottom surface of the frame member 82 provided at an end portion of the process cartridge 80 on the front side along the mount direction (X direction). The projected portion 85 has a non-compatible shape to be mountable to only the recessed portion 96 of the cartridge support portion 91 for the corresponding color.

As illustrated in FIG. 9, the apparatus body 1*a* includes a positioning member 97 provided at an end portion on the back side along the mount direction (X direction) of the process cartridge 80 to relatively engage with the first drive force transmission portion 77 of the photosensitive drum 11 provided to the process cartridge 80 to move an end portion of the process cartridge 80 on the distal end side to be positioned at a working position set on the upper side. That is, the positioning member 97 moves the first drive force transmission portion 77*a* of the process cartridge 80 to be positioned at an operating position on the upper side.

Figure 10:
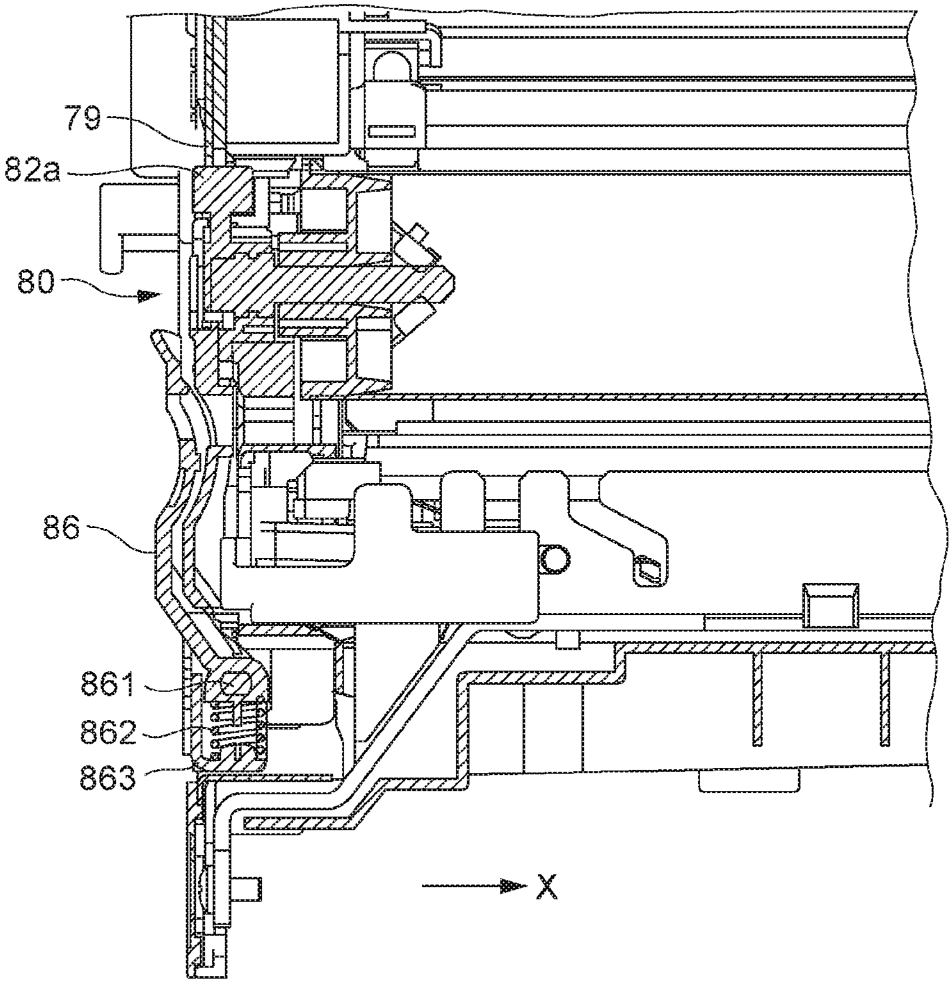
FIG. 10 is a sectional view illustrating the configuration of a particular portion of the mount portion for the process cartridges.

As illustrated in FIG. 8, meanwhile, an ascent/descent lever 86 is turnably provided at an end portion of the process cartridge 80 on the front side along the mount direction (X direction). The ascent/descent lever 86 moves the process cartridge 80 to the working position on the upper side. As illustrated in FIG. 10, the ascent/descent lever 86 is attached to the frame member 82 of the process cartridge 80 so as to be turnable about a turning shaft 861. In addition, the ascent/descent lever 86 includes an abutment portion 863 which is provided below the turning shaft 861 and to which an elastic force in the direction of moving away from the turning shaft 861 is applied via a coil spring 862.

As illustrated in FIG. 8, the ascent/descent lever 86 is turned to the front side of the process cartridge 80 before the process cartridge 80 is mounted to the prescribed operating position. After the process cartridge 80 is moved to the operating position of the cartridge support portion 91, the ascent/descent lever 86 is turned clockwise by about 90 degrees to be substantially parallel to an end surface of the process cartridge 80 on the front side as illustrated in FIG. 10. With such an operation, the ascent/descent lever 86 moves an end portion of the process cartridge 80 on the front side along the mount direction to the operating position on the upper side using the principle of leverage about the turning shaft 861. As discussed above, an end portion of the process cartridge 80 on the back side has already been moved to the operating position on the upper side. At this time, as illustrated in FIGS. 1 and 2, the photosensitive drum 11 of the process cartridge 80 is stopped at the operating position at which the photosensitive drum 11 is in contact with the first transfer device 15 via the intermediate transfer belt 21. As illustrated in FIG. 10, an end portion of the process cartridge 80 on the front side along the mount direction (X direction) is positioned at the operating position by causing an upper end surface 82*a* of the frame member 82 on the front side along the mount direction to abut against the lower surface of the abutment portion 79 of the apparatus body 1*a*.

As illustrated in FIG. 4, the process cartridge 80 is provided with a grip portion 87 to be gripped by a hand of a user when the process cartridge 80 is mounted to and removed from the apparatus body 1*a*. In addition, a distal end portion 162*a* of the feeding member 162 of the drum cleaning device 16 is provided so as to project in a cylindrical shape at the upper right portion of the front surface of the process cartridge 80.

It is not necessary that the process cartridge 80 should include all of the image forming members such as the photosensitive drum 11 and the charging device 12, the developing device 14, and the drum cleaning device 16 disposed around the photosensitive drum 11. The process cartridge 80 may be composed of the photosensitive drum 11, the charging device 12, and the developing device 14, or may be composed of the photosensitive drum 11, the developing device 14, and so forth, among the image forming members.

As illustrated in FIG. 8, the process cartridge 80 is mounted at the prescribed operating position of the apparatus body 1*a* to be supplied with a drive force and electric power from the apparatus body 1*a* side.

<Operation of Image Forming Apparatus>

Basic image forming operation performed by the image forming apparatus 1 will be described below.

Operation for forming a full-color image by combining toner images in four colors (Y, M, C, K) using the four image preparing devices 10 (Y, M, C, K) will be described.

As illustrated in FIGS. 1 and 2, when the image forming apparatus 1 receives command information requesting image forming operation (printing), the four image preparing devices 10 (Y, M, C, K), the intermediate transfer device 20, the second transfer device 30, the fixing device 40, and so forth are started.

In each of the image preparing devices 10 (Y, M, C, K), first, the photosensitive drum 11 rotates in the direction indicated by the arrow A, and the charging device 12 charges the surface of the photosensitive drum 11 with a prescribed polarity (in the first exemplary embodiment, negative polarity) and a prescribed potential. Then, the exposure device 13 radiates the surface of the photosensitive drum 11 after being charged with light emitted on the basis of a signal for an image obtained by converting information on an image input to the image forming apparatus 1 into each color component (Y, M, C, K). Thus, an electrostatic latent image for each color component with a prescribed potential difference is formed on the surface of the photosensitive drum 11.

Then, the developing device 14 (Y, M, C, K) develops the electrostatic latent image for each color component formed on the photosensitive drum 11 by supplying a toner for the corresponding color (Y, M, C, K) charged with a prescribed polarity (negative polarity) from the developing roller 141 for electrostatic adhesion. As a result of the development, the electrostatic latent images for the various color components formed on the photosensitive drums 11 are rendered manifest as toner images in the four colors (Y, M, C, K) developed using toners for the corresponding colors.

Then, when the toner image in each color formed on the photosensitive drum 11 of the image preparing device 10 (Y, M, C, K) is transported to the first transfer position, the first transfer device 15 performs a first transfer on the toner image in each color such that the toner images in the various colors are sequentially superposed on the intermediate transfer belt 21 of the intermediate transfer device 20 which rotates in the direction indicated by the arrow B.

In the image preparing devices 10 which have finished the first transfer, the drum cleaning device 16 removes, or scrapes off, attached matter to clean the surface of the photosensitive drum 11. This allows the image preparing devices 10 to be ready for the next image preparing operation.

Then, the intermediate transfer device 20 transports the toner images which have been subjected to the first transfer to the second transfer position through rotation of the intermediate transfer belt 21. Meanwhile, the paper feed device 50 feeds the prescribed recording paper 5 to the paper feed/transport path 56 in accordance with the image preparing operation. In the paper feed/transport path 56, the pair of paper transport rollers 54 that serve as resist rollers feed the recording paper 5 to the second transfer position in accordance with the transfer timing to supply the recording paper 5.

At the second transfer position, the second transfer roller 31 of the second transfer device 30 collectively performs a second transfer of the toner images on the intermediate transfer belt 21 onto the recording paper 5. In the intermediate transfer device 20 which has finished the second transfer, the belt cleaning device 27 removes attached matter such as a toner remaining on the surface of the intermediate transfer belt 21 after the second transfer.

Then, the recording paper 5, onto which the toner images have been transferred through the second transfer, is peeled from the intermediate transfer belt 21 and the second transfer roller 31, and thereafter transported to the fixing device 40 via the transport guides 57 and 58. In the fixing device 40, the recording paper 5 after being subjected to the second transfer is introduced to the contact portion between the heating rotary member 41 and the pressurizing rotary member 42 which are rotating to pass through the contact portion to perform a necessary fixation process (heating and pressurization) to fix unfixed toner images to the recording paper 5. Lastly, in the case of image forming operation in which an image is to be formed on only one surface of the recording paper 5, the recording paper 5 after being subjected to the fixation is ejected to the paper ejection portion 60 provided at the upper portion of the apparatus body 1*a*, for example, by the pair of paper ejection rollers 61.

In the case where an image is to be formed on both surfaces of the recording paper 5, meanwhile, the recording paper 5, on one surface of which an image has been formed, is not ejected to the paper ejection portion 60 by the pair of paper ejection rollers 61, and the rotational direction of the pair of paper ejection rollers 61 is switched to the reverse direction while the pair of paper ejection rollers 61 hold the rear end of the recording paper 5. The recording paper 5 transported in the reverse direction by the pair of paper ejection rollers 61 passes over the switching gate 62, and thereafter is transported again to the pair of paper transport rollers 54, with the front and back sides of the recording paper 5 reversed, via the two-sided printing transport path 63 which includes the pair of paper transport rollers 64, the transport guides 65 to 68, and so forth. The pair of paper transport rollers 54 feed the recording paper 5 to the second transfer position in accordance with the transfer timing so that an image is formed on the back surface of the recording paper 5. The recording paper 5 is ejected to the paper ejection portion 60 provided at the upper portion of the apparatus body 1*a* by the pair of paper ejection rollers 61.

As a result of the operation described above, the recording paper 5 is output with a full-color image formed thereon by combining the toner images in the four colors.

<Configuration of Specific Portion of Image Forming Apparatus>

Figure 11A:
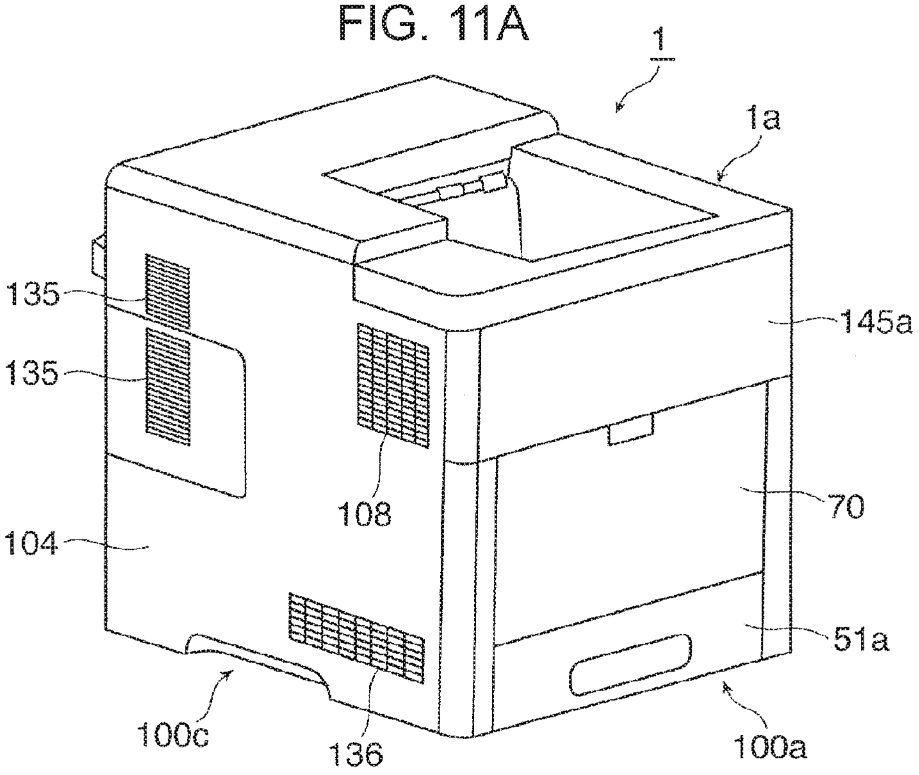
FIGS. 11A and 11B are each a perspective view illustrating the configuration of an apparatus body of the image forming apparatus according to the first exemplary embodiment of the present invention.
Figure 11B:
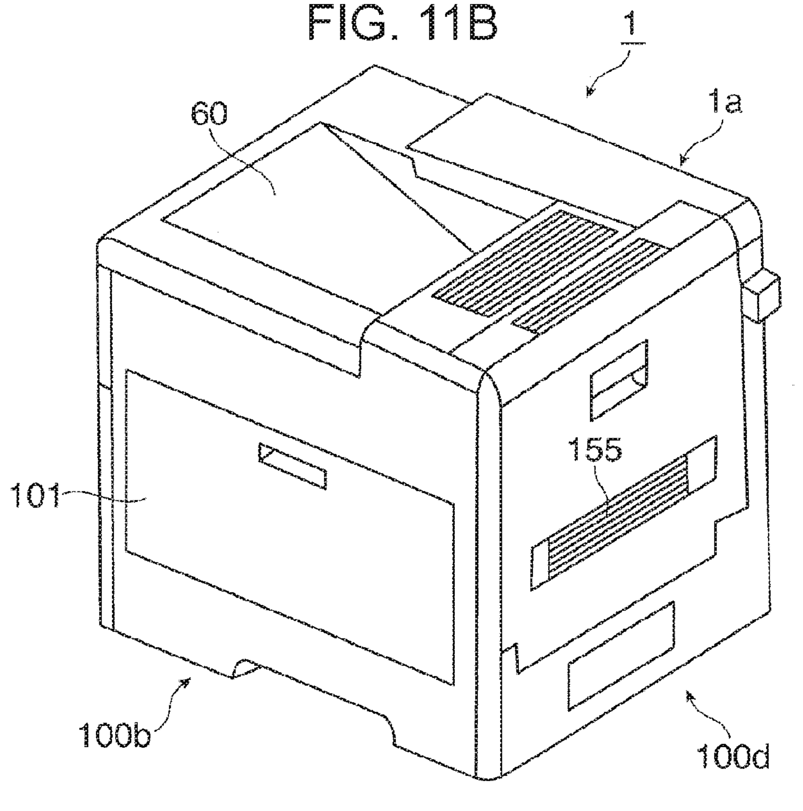

FIGS. 11A and 11B are perspective views illustrating the appearance of the apparatus body of the image forming apparatus as seen from different angles.

As illustrated in FIG. 11A, the apparatus body 11*a* of the image forming apparatus 1 is formed to have a substantially rectangular parallelepiped appearance. An operation panel 51*a* that constitutes the paper storing members 51 of the paper feed device 50 is provided at the lower end portion of a front surface 100*a* of the apparatus body 1*a* so as to be drawable. In addition, the manual feed tray 70 is provided at the center portion of the front surface 100*a* of the apparatus body 1*a* so as to be openable and closable about a fulcrum (not illustrated) provided at the lower end portion of the manual feed tray 70. Further, a cartridge cover 145*a* is attached to the upper end portion of the front surface 100*a* of the image forming apparatus body 1*a* so as to be openable and closable about a fulcrum (not illustrated) provided at the lower end portion of the cartridge cover 145*a*. The cartridge cover 145*a* allows the toner cartridges 145 (Y, M, C, K) to be mounted and removed.

Figure 12:
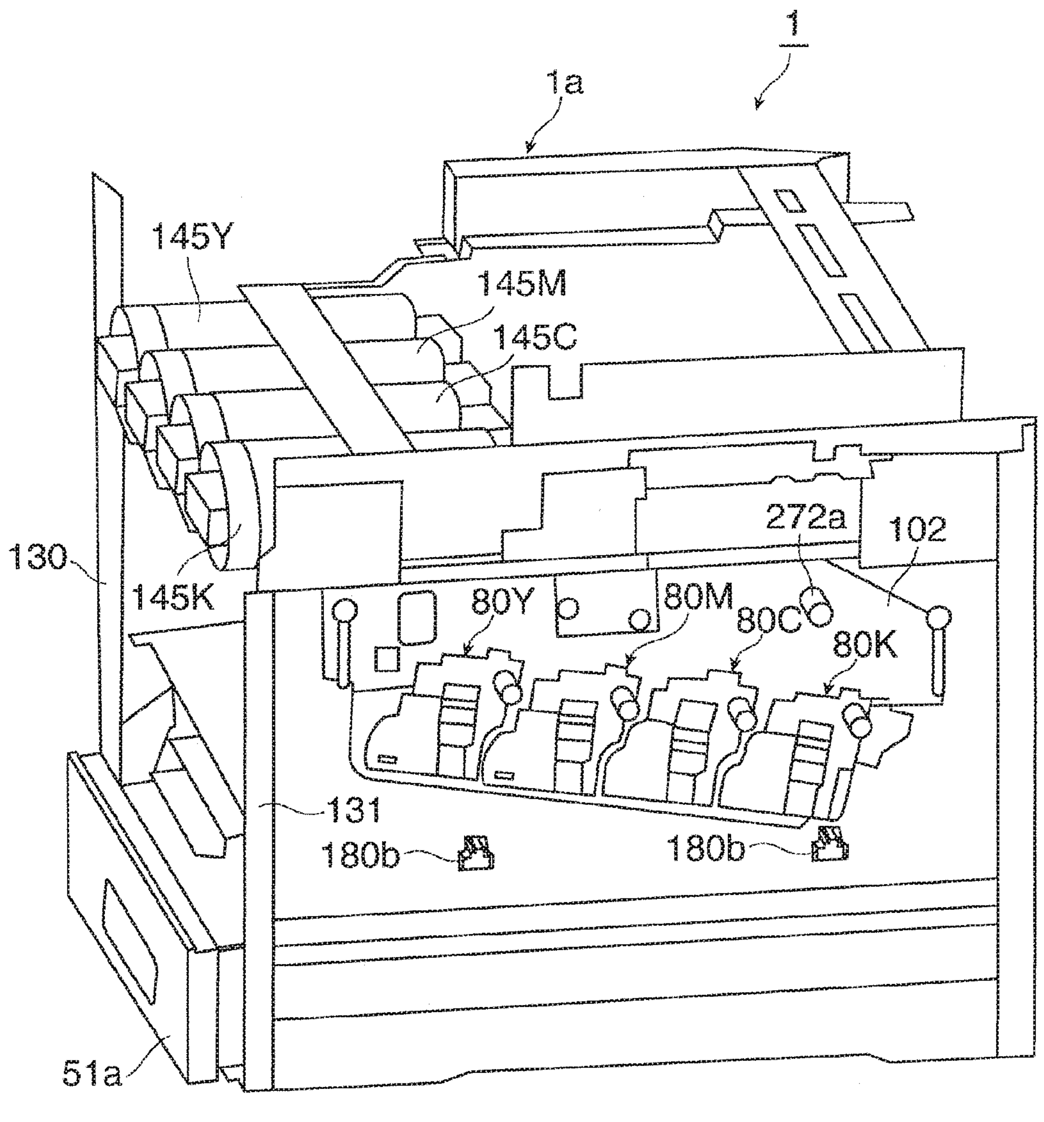
FIG. 12 is a sectional view illustrating a state in which a waste toner recovery container is mounted.

As illustrated in FIG. 11B, a side cover 101 is provided on a right side surface 100*b* of the apparatus body 1*a* so as to be openable and closable about a fulcrum (not illustrated) provided at the lower end portion of the side cover 101. The side cover 101 serves as an example of an open/close member that covers an opening portion (operation portion) 102 (see FIG. 12) that allows an operation such as mounting and removing the process cartridges 80 (Y, M, C, K) for yellow (Y), magenta (M), cyan (C), and black (K) and a waste toner recovery container 180 that serves as an example of a waste toner housing container to be discussed later. As illustrated in FIG. 12, end portions of the process cartridges 80 (Y, M, C, K) for yellow (Y), magenta (M), cyan (C), and black (K) on the front side along the mount/removal direction are exposed to the opening portion 102, and a distal end portion 272*a* of the feeding member 272 of the belt cleaning device 27 is exposed to the opening portion 102. The distal end portion 272*a* is formed in a cylindrical shape.

Figure 13:
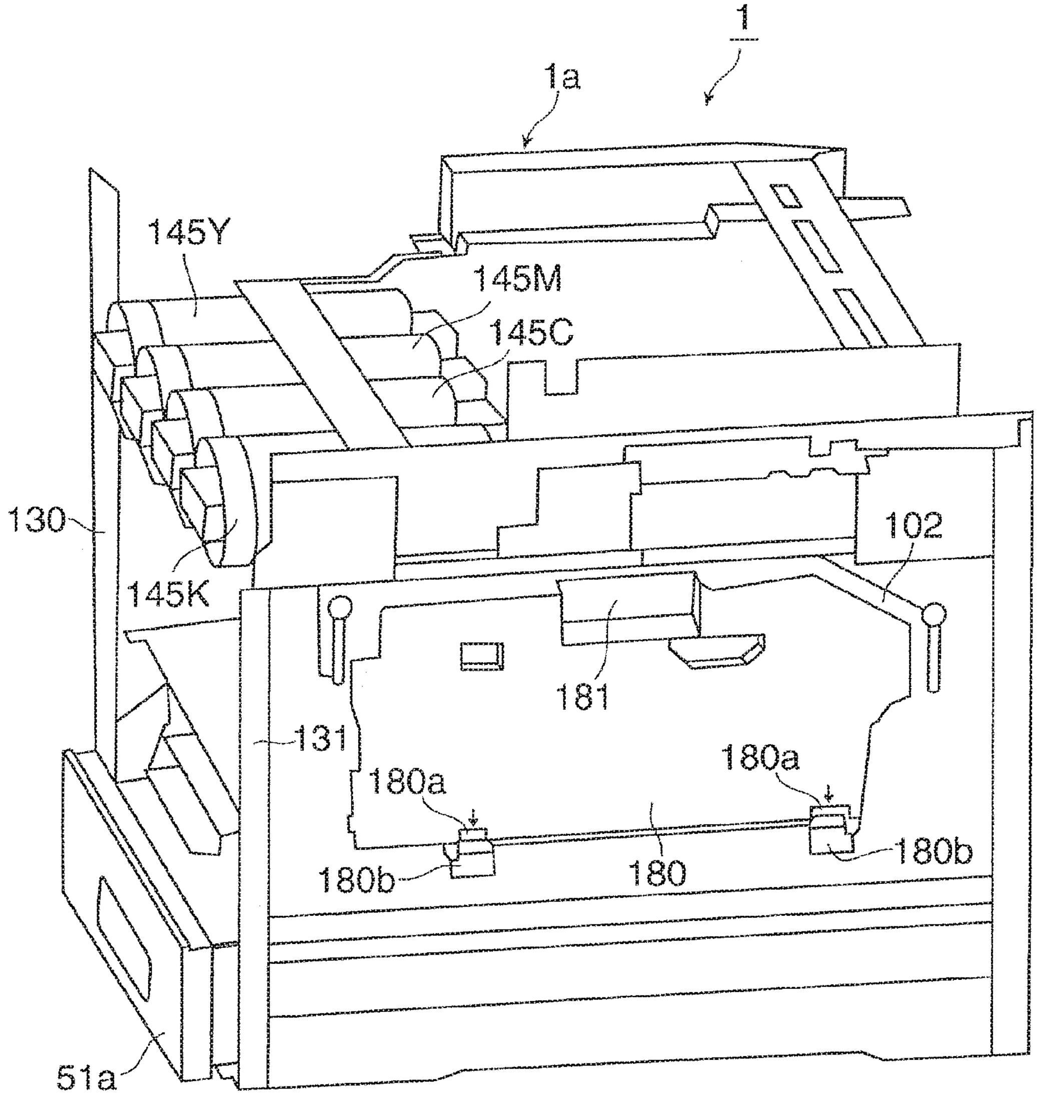
FIG. 13 is a sectional view illustrating a state in which the waste toner recovery container has been removed.

As illustrated in FIG. 13, the waste toner recovery container 180 is removably provided in the opening portion 102 which is provided in the right side surface 100*b* of the apparatus body 1*a*. The waste toner recovery container 180 recovers a waste toner etc. discharged from the process cartridges 80 (Y, M, C, K) for yellow (Y), magenta (M), cyan (C), and black (K) and the belt cleaning device 27, and serves as an example of an operation member that is operable for mounting to and removal from the apparatus body 1*a*. The waste toner recovery container 180 is formed in the shape of a thin box that is substantially rectangular as seen from the front. The waste toner recovery container 180 is mounted to and removed from the apparatus body 1*a* by turning an operation lever 181 provided at the center of the upper end portion of the waste toner recovery container 180 with two engagement recessed portions 180*a* provided at the lower end portion of the waste toner recovery container 180 engaged with engagement projecting portions 180*b* provided at the lower end portion of the opening portion 102 of the apparatus body 1*a*.

Figure 14:
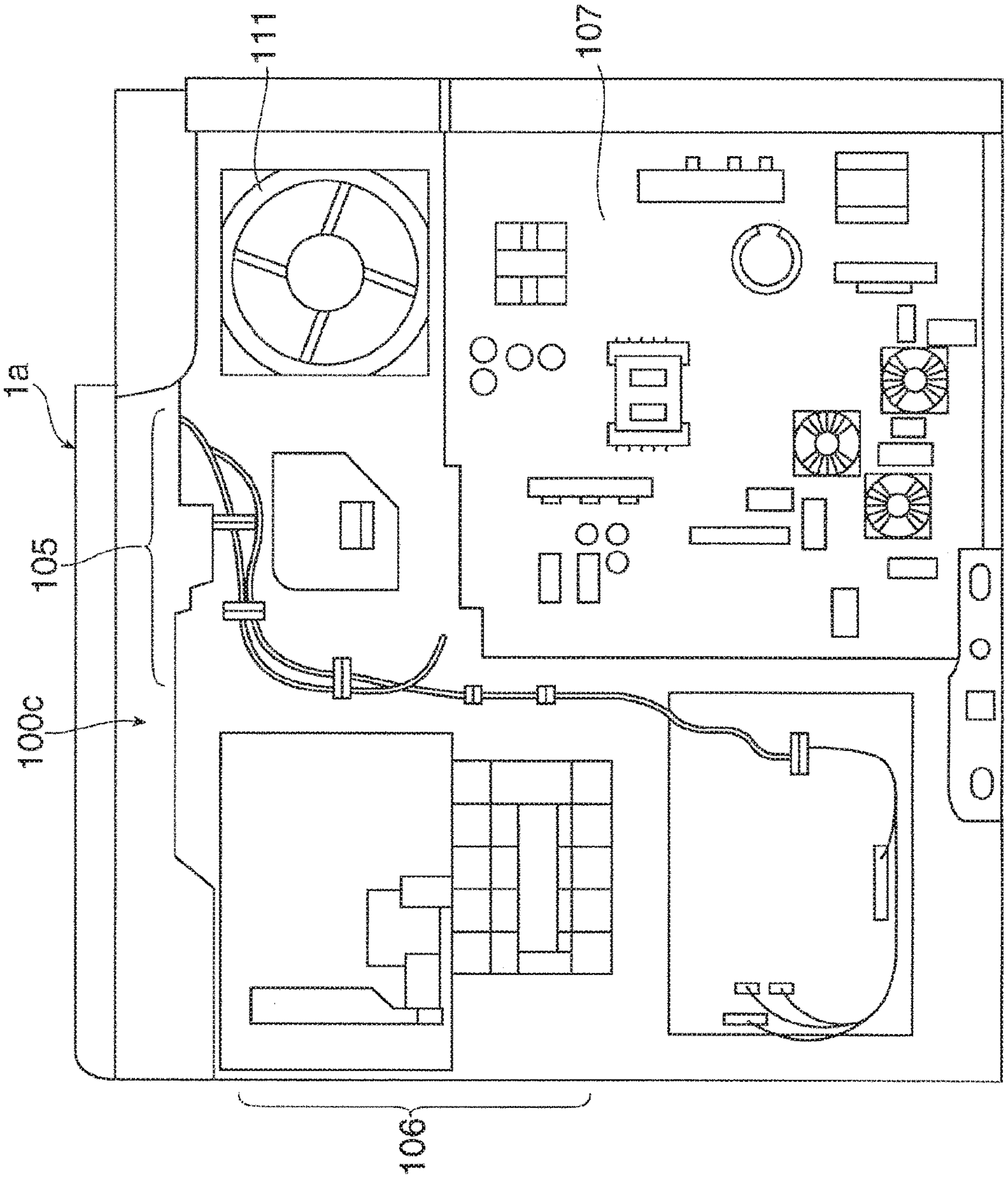
FIG. 14 illustrates the left side surface of the inside of the image forming apparatus according to the first exemplary embodiment of the present invention.

As illustrated in FIG. 11A, meanwhile, a left side surface 100*c* of the apparatus body 1*a* is covered by an exterior cover 104 that constitutes the apparatus body 1*a*. As illustrated in FIG. 14, a drive device 105, an image processing device 106, and a low-voltage power source device 107 are disposed inside the exterior cover 104. The drive device 105 includes a drive motor (not illustrated) that drives the image preparing devices 10 (Y, M, C, K) for yellow (Y), magenta (M), cyan (C), and black (K), the intermediate transfer device 20, and so forth. The image processing device 106 performs prescribed image processing on image data input to the image forming apparatus 1 from the outside via an input terminal. The low-voltage power source device 107 supplies a low voltage to the drive device 105, the image processing device 106, and so forth. The drive device 105 is positioned at the center of the upper portion on the left side surface 100*c* of the apparatus body 1*a*. The image processing device 106 is positioned to extend from the upper portion to the center portion at the left end of the left side surface 100*c* of the image forming apparatus body 1*a*. The low-voltage power source device 107 is positioned below the drive device 105 and on the right side of the image processing device 106 on the left side surface 100*c* of the image forming apparatus body 1*a*. The drive device 105, the image processing device 106, and the low-voltage power source device 107 are driven during image forming operation of the image forming apparatus 1 to generate a drive force, or activate an electronic circuit to perform signal processing or generate low-voltage electric power, and generate heat along with the image forming operation. Therefore, the drive device 105, the image processing device 106, and the low-voltage power source device 107 constitute a portion to be cooled (a portion to be ventilated) that needs to be ventilated to be cooled.

In addition, the image preparing devices 10 (Y, M, C, K) for yellow (Y), magenta (M), cyan (C), and black (K), the intermediate transfer device 20, and the fixing device 40 generate heat or generate powder dust such as a toner along with rotational operation of a drive portion, exposure operation, fixing operation, and so forth that accompany the image forming operation. Therefore, the image preparing devices 10 (Y, M, C, K), the intermediate transfer device 20, and the fixing device 40 also constitute a portion to be cooled (a portion to be ventilated) that needs to be cooled or ventilated.

Figure 15A:
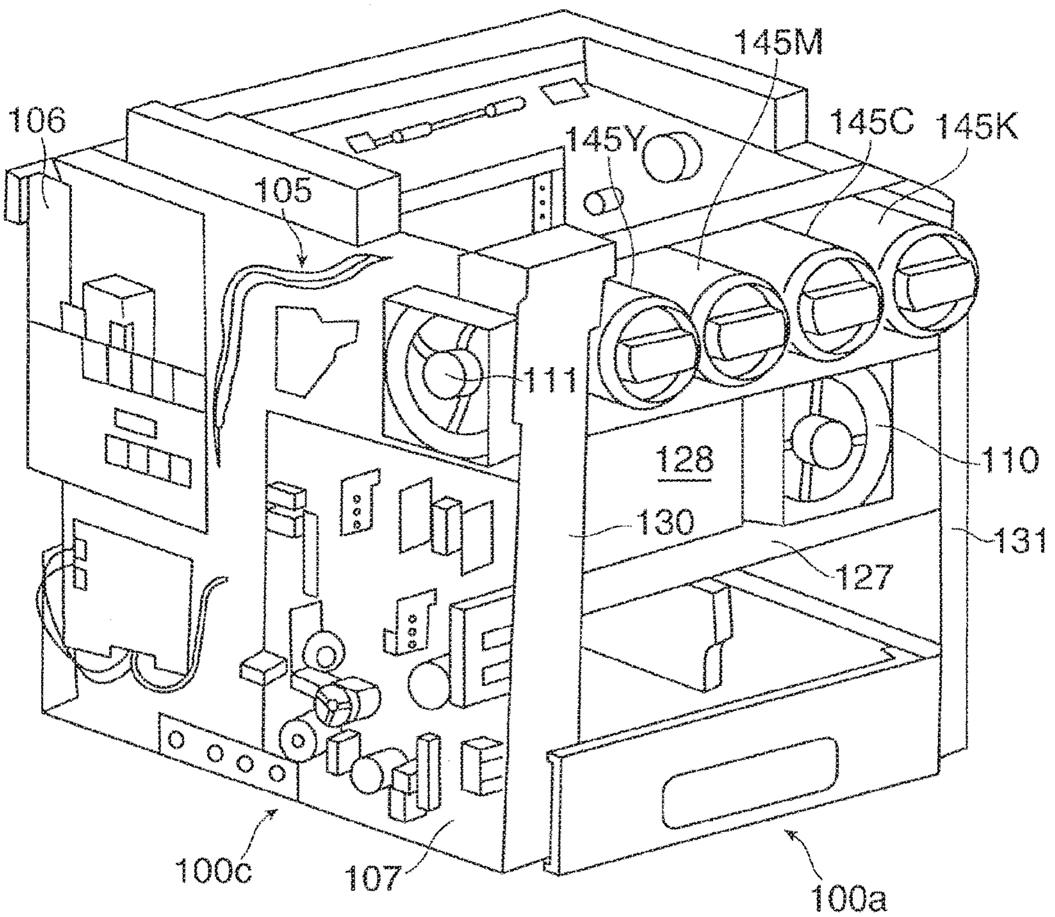
FIGS. 15A and 15B are each a perspective view illustrating the configuration of a particular portion of the image forming apparatus according to the first exemplary embodiment of the present invention.

As illustrated in FIG. 15A, the apparatus body 1*a* includes a front fan 110 and a principal fan 111. The front fan 110 serves as an example of a first air blowing unit disposed on the front surface 100*a* which serves as an example of a side surface of the apparatus body 1*a* that is adjacent to a side surface (right side surface 100*b*) on which the side cover 101 (see FIG. 11B) is installed. The principal fan 111 serves as an example of a second air blowing unit disposed on the left side surface 100*c* of the apparatus body 1*a*. The front fan 110 principally suctions air from the front surface 100*a* of the apparatus body 1*a*, and separately blows air to spaces above and below the image forming portion. Meanwhile, the principal fan 111 suctions air from the left side surface 100*c* of the apparatus body 1*a*, and blows air to the drive device 105, the image processing device 106, and the low-voltage power source device 107, which are disposed on the left side surface 100*c* of the apparatus body 1*a*, and the front fan 110. As illustrated in FIG. 11A, an intake port 108 through which the principal fan 111 suctions air opens in the left side surface 100*c* of the apparatus body 1*a*. The intake port 108 includes louvers that serve as a foreign matter entry prevention member that prevents entry of foreign matter.

Figure 15B:
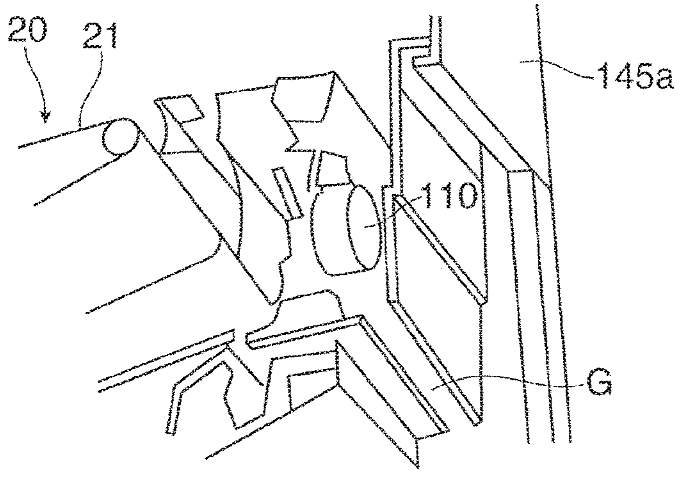

As discussed above, the front fan 110 is disposed on the front surface 100*a* of the apparatus body 1*a*, and principally suctions air from the front surface 100*a* of the apparatus body 1*a*. However, as illustrated in FIG. 11A, the operation panel 51*a* of the paper feed device 50, the manual feed tray 70, and the cartridge cover 145*a* are disposed on the front surface 100*a* of the apparatus body 1*a*. Therefore, unlike the left side surface 100*c*, an intake port 108 may not be provided in the front surface 100*a* of the apparatus body 1*a*. As illustrated in FIG. 15B, the front fan 110 principally suctions air from a gap provided between the cartridge cover 145*a* and the manual feed tray 70 and a gap G formed in the inner surface of the manual feed tray 70. In the exemplary embodiment, further, the front fan 110 is configured to suction a part of air blown by the principal fan 111. FIG. 15B is a partially cutaway perspective view illustrating a state in which the manual feed tray 70 is opened.

As illustrated in FIG. 14, the principal fan 111 includes a first branch duct 120 provided on the inner surface thereof (back side in FIG. 14). The first branch duct 120 includes a first branch portion, a second branch portion, and a third branch portion. The first branch portion feeds the air which is fed from the principal fan 111 to the drive device 105 and the image processing device 106 which serve as an example of a first portion to be cooled (first object to be cooled). The second branch portion feeds the fed air to the low-voltage power source device 107 which serves as an example of a second portion to be cooled. The third branch portion feeds the fed air to be suctioned by the front fan 110.

Figure 16:
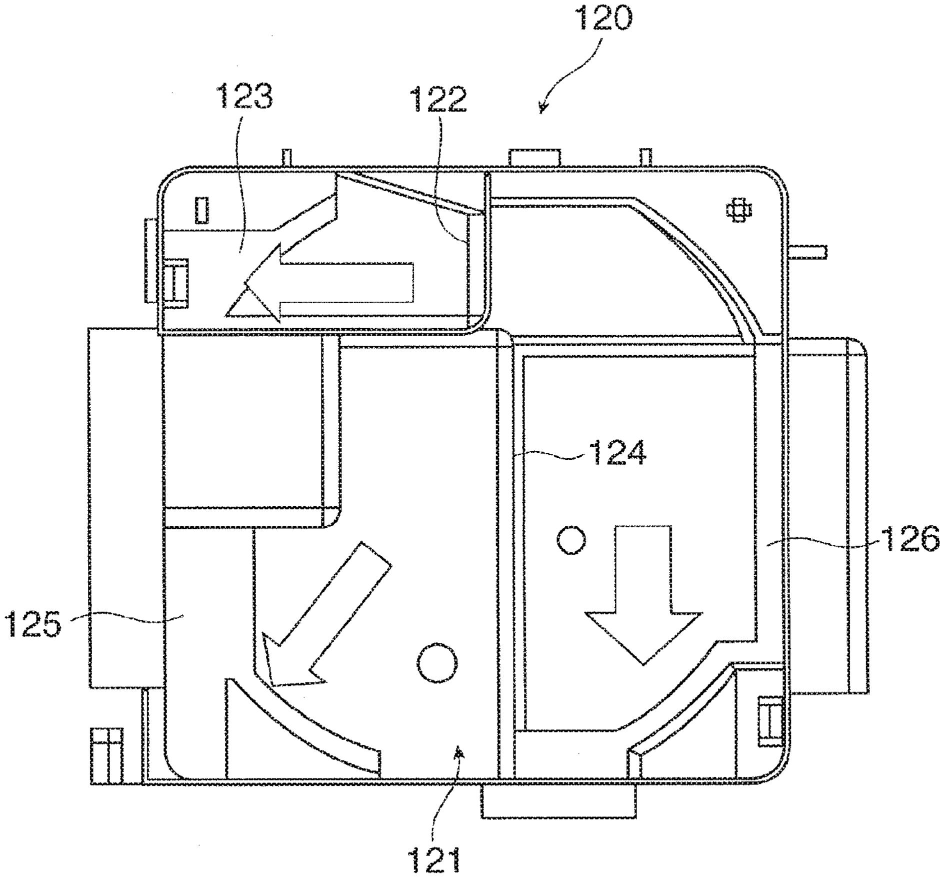
FIG. 16 is a front view illustrating the configuration of a duct branch member.

As illustrated in FIG. 16, the first branch duct 120 includes an opening portion 121 formed in substantially the same shape as the shape of the front surface of the principal fan 111. The opening portion 121 is divided into a first branch portion 123, a second branch portion 125, and a third branch portion 126. The first branch portion 123 is defined by a partition wall 122 at the upper left portion. The second branch portion 125 is defined by a partition wall 124 below the first branch portion 123 so as to occupy about two-thirds of the region of the left side of the opening portion 121. The third branch portion 126 occupies about half the region of the right side of the opening portion 121.

As illustrated in FIG. 15A, an air flow fed to the third branch portion 126 is guided downward on the inner side of a left side plate 130 of the apparatus body 1*a*, and fed to the front fan 110 via a duct 128 in a duct member 127 disposed on the front surface of the apparatus body 1*a*. The third branch portion 126 occupies about half the area of the opening portion 121. About half the air blown by the principal fan 111 is supplied to be suctioned by the front fan 110. The amount of air to be suctioned by the front fan 110 is not limited to about half the air blown by the principal fan 111, and may be set as appropriate in accordance with the opening area of the third branch portion 126 of the branch duct 120.

Figure 17A:
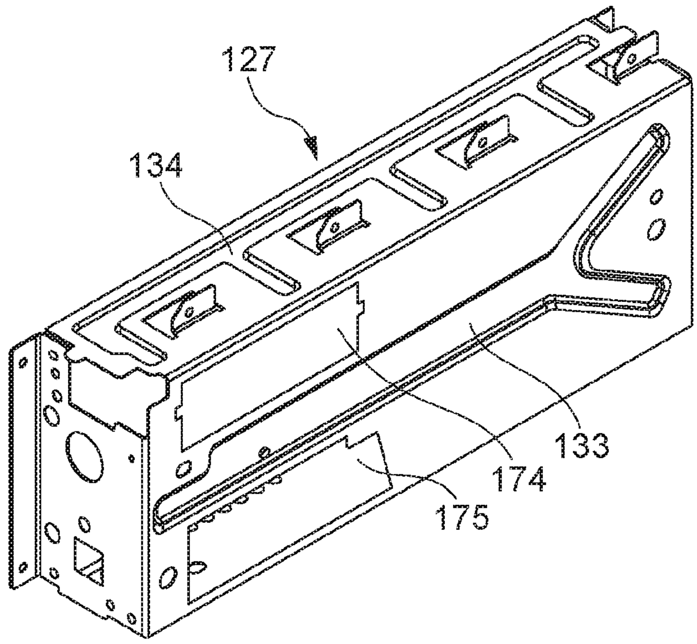
FIGS. 17A and 17B illustrate a duct forming member.
Figure 17B:
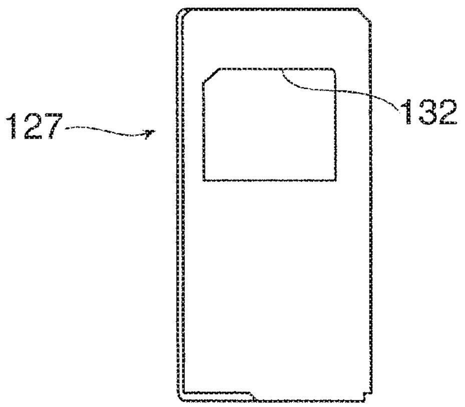

As illustrated in FIG. 15A, the duct member 127 also plays a role as a structure that mechanically couples the left side plate 130 and a right side plate 131, which are disposed on the left and right sides of the front surface 100*a* of the apparatus body 1*a*, to each other to fix the left side plate 130 and the right side plate 131. As illustrated in FIG. 17A, the duct member 127 is constituted as a substantially rectangular parallelepiped box that is entirely open on the side of the front surface 100*a* of the apparatus body 1*a* by folding a metal sheet. As illustrated in FIG. 17B, an introduction port 132 that introduces an air flow from the third branch portion 126 opens in one side surface of the duct member 127. As illustrated in FIG. 15A, the front fan 110 is mounted to the right end portion inside the duct member 127. In FIG. 17A, reference numerals 133 and 134 denote reinforcing ribs that enhance the rigidity of the duct member 127.

As illustrated in FIG. 14, the air flow which has been fed to the first branch portion 123 in the first branch duct 120 is fed to the image processing device 106 via the drive device 105. As illustrated in FIG. 11A, the air flow which has been fed to the image processing device 106 is discharged to the outside from a first exhaust port 135 that opens in the left side surface 100*c* of the apparatus body 1*a*. The first exhaust port 135 includes louvers that serve as a foreign matter entry prevention member that prevents entry of foreign matter.

As illustrated in FIG. 14, the air flow which has been fed to the second branch portion 125 in the first branch duct 120 is fed to the low-voltage power source device 107. As illustrated in FIG. 11A, the air flow which has been fed to the low-voltage power source device 107 is discharged to the outside from a second exhaust port 136 that opens in the lower portion of the left side surface 100*c* of the apparatus body 1*a*. The second exhaust port 136 includes louvers that serve as a foreign matter entry prevention member that prevents entry of foreign matter.

Meanwhile, as illustrated in FIG. 1, the front fan 110 includes a second branch duct 137 that separately feeds the air which has been fed from the front fan 110 to spaces above and below the image forming portion.

Figure 18A:
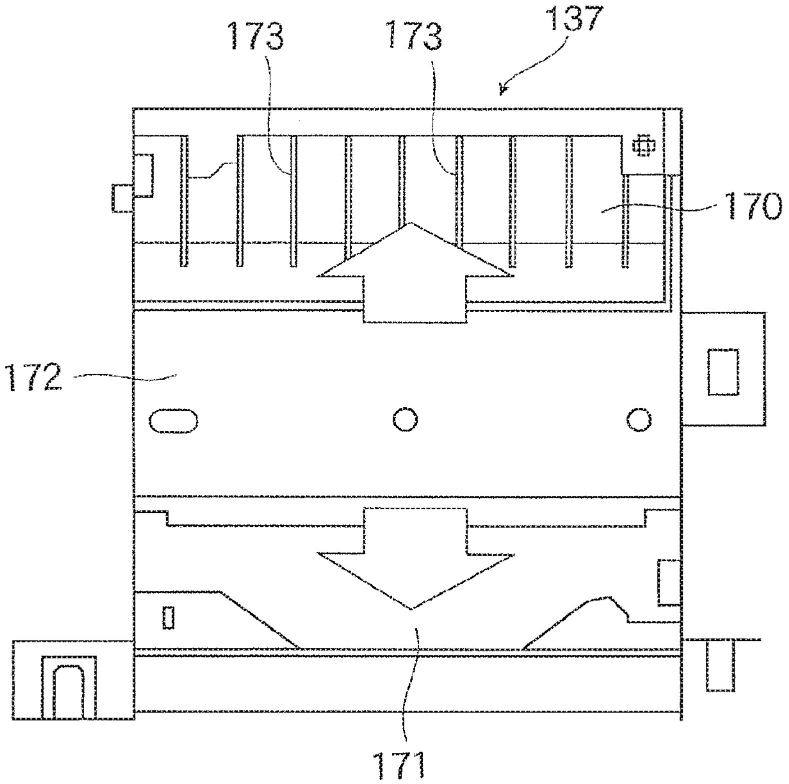
FIGS. 18A to 18C illustrate the configuration of a second duct branch member.
Figure 18B:
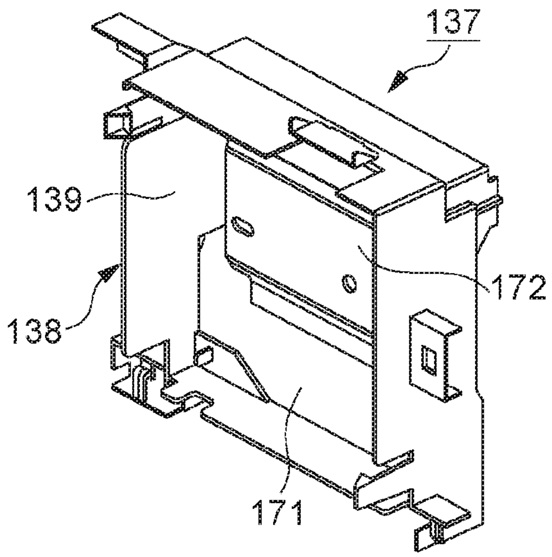
Figure 18C:
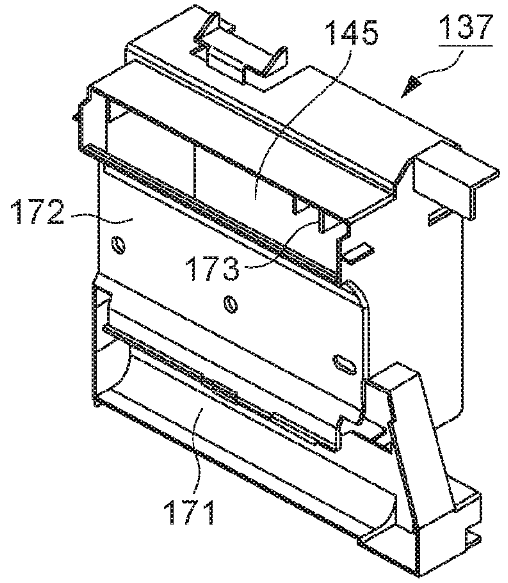

As illustrated in FIGS. 18A to 18C, the second branch duct 137 includes a duct body 138 formed as a frame body having a rectangular shape, as seen from the front, corresponding to the outer peripheral shape of the front fan 110. The front surface of the duct body 138 has an opening portion 139 formed in substantially the same shape as the shape of the front fan 110 as seen from the front. Meanwhile, the back surface of the second branch duct 137 has an upper intake portion 170 and a lower intake portion 171 that separately open to spaces above and below the image forming portion. The upper intake portion 170 and the lower intake portion 171 are separated from each other by a shield plate portion 172. The upper intake portion 170 includes plural rectification plates 173 provided to extend in the vertical direction to rectify the flow of air. The plural rectification plates 173 are disposed at constant intervals along the horizontal direction to extend in parallel with each other. The front fan 110 is attached to the duct member 127 as mounted inside the second branch duct 137. As illustrated in FIG. 17A, the duct member 127 is provided with opening portions 174 and 175 corresponding to the upper intake portion 170 and the lower intake portion 171, respectively.

Figure 19A:
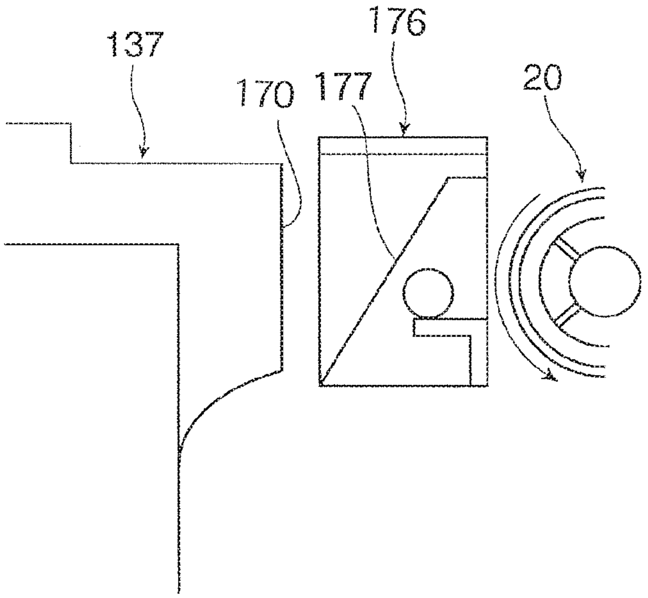
FIGS. 19A and 19B each illustrate a particular portion of the image forming apparatus according to the first exemplary embodiment of the present invention.

As illustrated in FIG. 19A, the upper intake portion 170 of the second branch duct 137 is disposed at a position facing the intermediate transfer device 20. An air guiding member 176 is provided at a position facing the upper intake portion 170 of the second branch duct 137. The air guiding member 176 guides an air flow suctioned from the upper intake portion 170 to the upper portion of the intermediate transfer device 20. The air guiding member 176 includes an inclined surface 177 that guides the air flow which is suctioned from the upper intake portion 170 to the upper portion of the intermediate transfer belt 21 of the intermediate transfer device 20. The air flow which has been guided to the upper portion of the intermediate transfer device 20 moves to the upstream side along the moving direction of the intermediate transfer belt 21 along the upper surface of the intermediate transfer belt 21, and is discharged to the outside from a back surface 100*d* of the apparatus body 1*a* through a ventilation passage 154 (see FIG. 1) formed between the second transfer device 30 and the fixing device 40. As illustrated in FIG. 11B, a third exhaust port 155 opens in the back surface 100*d* of the apparatus body 1*a*. The third exhaust port 155 includes louvers.

Figure 19B:
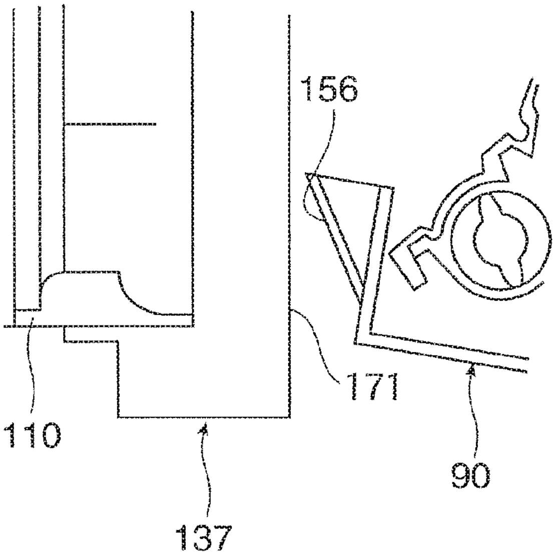

As illustrated in FIG. 19B, the lower intake portion 171 of the second branch duct 137 is disposed at a position facing the unit mount member 90 to which the image preparing devices 10 (Y, M, C, K) are mounted. An air guiding portion 156 is provided at an end portion of the unit mount member 90 on the second branch duct 137 side. The air guiding portion 156 guides an air flow suctioned from the lower intake portion 171 to a space below the unit mount member 90 and the high-voltage power source device 77. The air guiding portion 156 is constituted from an inclined surface that guides the air flow which is fed from the lower intake portion 171 to both the image forming portion and the high-voltage power source device 77. The air guiding portion 156 is provided integrally with the unit mount member 90. A part of the air flow which has been guided by the air guiding portion 156 cools the high-voltage power source device 77. As illustrated in FIG. 11B, the air flow which has been fed to the high-voltage power source device 77 is discharged to the outside from the third exhaust port 155 which opens in the back surface 100*d* of the apparatus body 1*a*.

As illustrated in FIG. 19B, a part of the air flow which has been guided by the air guiding portion 156 flows into a space below the unit mount member 90. A ventilation guiding member 200 that serves as an example of a first guide member is provided below the unit mount member 90.

Figure 20A:
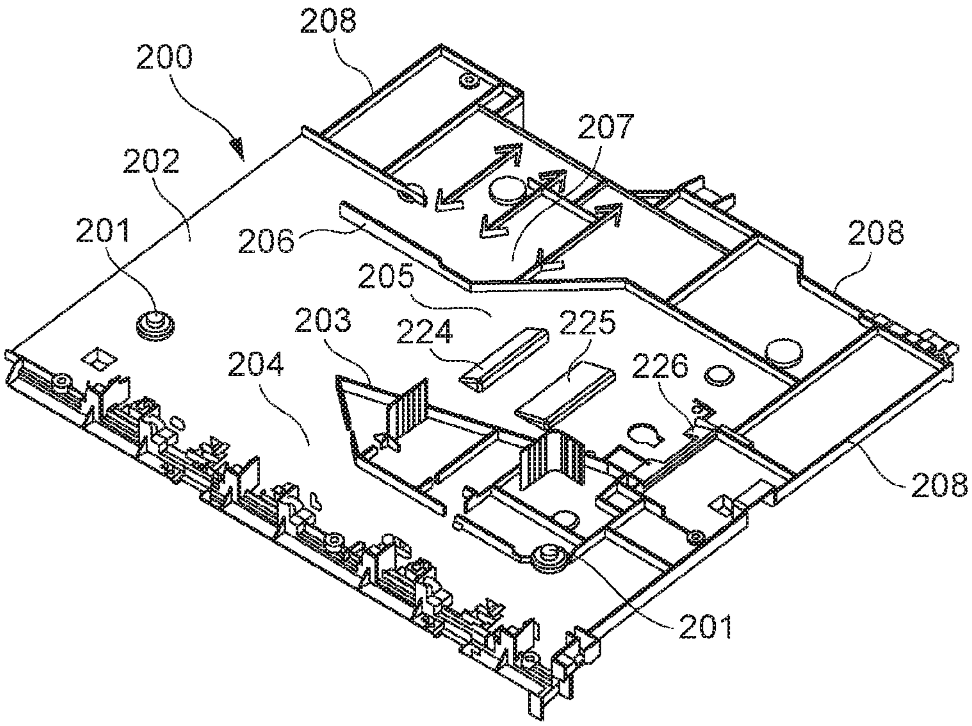
FIGS. 20A and 20B are each a perspective view illustrating the configuration of a ventilation guiding member.
Figure 20B:
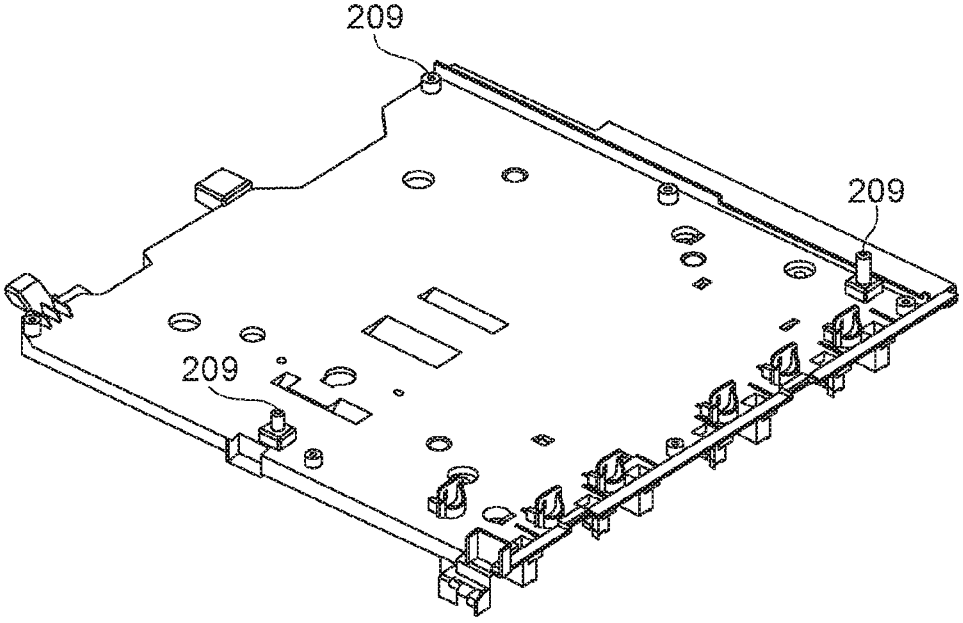

As illustrated in FIGS. 20A and 20B, the ventilation guiding member 200 is formed in a flat shape that is rectangular as seen in plan from a synthetic resin or the like through injection molding. The ventilation guiding member 200 is fixed to extend in parallel with the back surface of the unit mount member 90 via engagement projected portions 201 formed on the surface of the ventilation guiding member 200. The back surface of the ventilation guiding member 200 is provided plural ribs 209 for fixation of a substrate (not illustrated) of the high-voltage power source device 77. A ventilation passage 202 is formed between the ventilation guiding member 200 and the unit mount member 90. The ventilation passage 202 feeds air to the image preparing devices 10 (Y, M, C, K) for yellow (Y), magenta (M), cyan (C), and black (K). The ventilation passage 202 is divided by a first branch wall 203 into a first ventilation passage 204 and a second ventilation passage 205. The first branch wall 203 is formed on the surface of the ventilation guiding member 200. The first ventilation passage 204 feeds air to the front side of the image preparing devices 10 (Y, M, C, K). The second ventilation passage 205 feeds air to the back side of the image preparing devices 10 (Y, M, C, K). Air blown from the front fan 110 is directly fed to the first ventilation passage 204. Therefore, the amount and the pressure of air fed through the first ventilation passage 204 are greater than those of air fed through the second ventilation passage 205. Therefore, the air flow which has been branched by the first branch wall 203 to be fed to the first ventilation passage 204 and the second ventilation passage 205 is determined such that the amount and the pressure of air fed through the first ventilation passage 204 are greater than those of air fed through the second ventilation passage 205, and the air flow which has been guided to the ventilation passage 202 flows from the first ventilation passage 204 side to the second ventilation passage 205 side, that is, from the front side toward the back side along the mount direction of the process cartridges 80, when the air flow is guided to the upper surface of the unit mount member 90 as discussed later. In the illustrated exemplary embodiment, a third ventilation passage 207 is provided by a second branch wall 206 formed on the surface of the ventilation guiding member 200. The third ventilation passage 207 feeds air to the back surface side of the image preparing devices 10 (Y, M, C, K).

The ventilation passage 202 which is branched by the first branch wall 203 is set such that the passage width at an end portion on the front side along the mount direction of the process cartridge 80 is larger than the passage width at an intermediate portion. As discussed above, the arrangement and the shape of the first branch wall 203 are set such that a large amount of air is fed at an end portion on the front side along the mount direction of the process cartridge 80 compared to an intermediate portion and the back side. The first branch wall 203 may be set such that the amount of air fed at an end portion on the front side along the mount direction of the process cartridge 80 is substantially equal to the amount of air fed at an intermediate portion. Side walls 208 are provided at the outer periphery of the ventilation guiding member 200. The side walls 208 suppress leakage of air to the outside.

Figure 21:
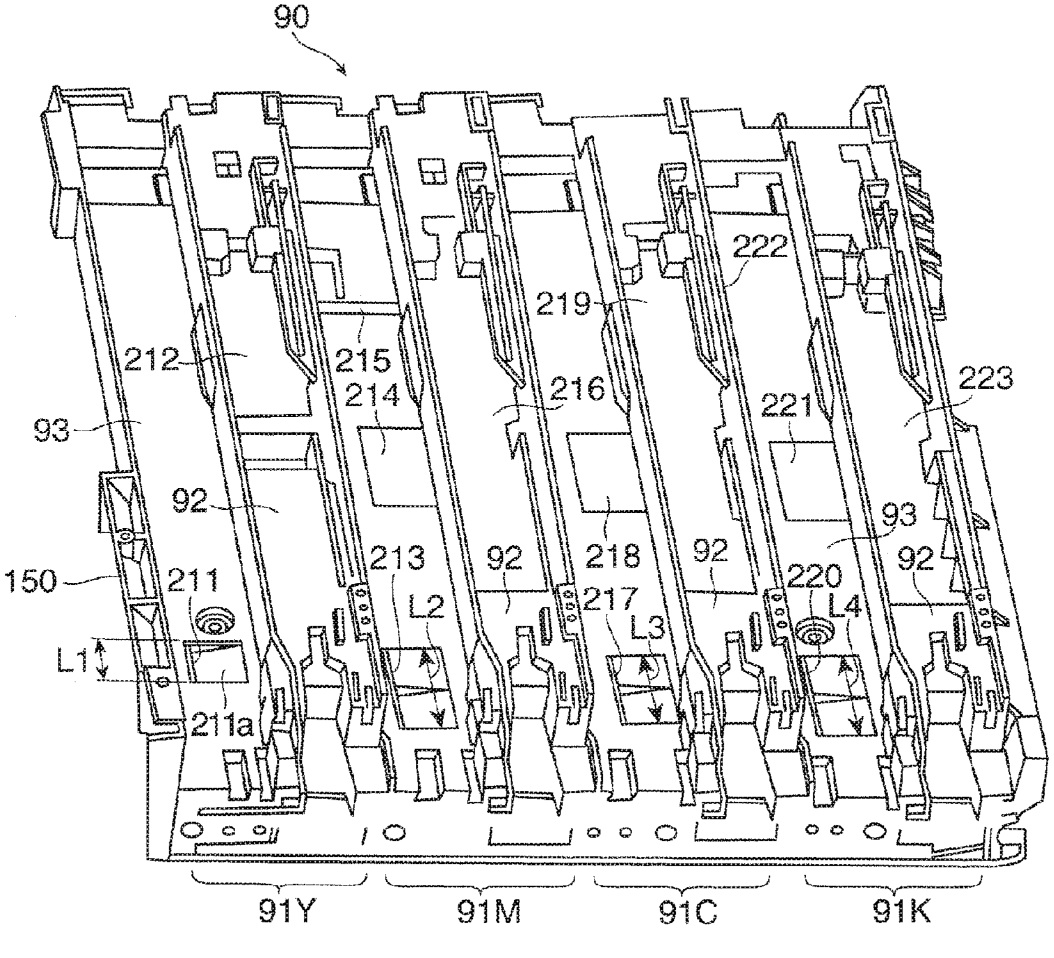
FIG. 21 is a perspective view illustrating the configuration of a unit mount member.

As illustrated in FIG. 21, the unit mount member 90 to which air is fed by the ventilation guiding member 200 includes plural opening portions through which air is fed to the process cartridges 80 (Y, M, C, K) for yellow (Y), magenta (M), cyan (C), and black (K).

The opening portion corresponding to the process cartridge 80Y for yellow (Y) is constituted from a first opening portion 211 and a second opening portion 212. The first opening portion 211 is provided at an end portion of the guide surface 93 for the developing device 14 on one end side. The second opening portion 212 is provided on the back side along the longitudinal direction of the mount platform 92 for the exposure device 13. The opening portion corresponding to the process cartridge 80M for magenta (M) is constituted from first to fourth opening portions 213 to 216. The first to third opening portions 213 to 215 are provided in the guide surface 93 for the developing device 14. The fourth opening portion 216 is provided to extend along the longitudinal direction of the mount platform 92 for the exposure device 13. The opening portion corresponding to the process cartridge 80C for cyan (C) is constituted from first to third opening portions 217 to 219. The first and second opening portions 217 and 218 are provided at an end portion on one end side and an intermediate portion, respectively, of the guide surface 93 for the developing device 14. The third opening portion 219 is provided to extend along the longitudinal direction of the mount platform 92 for the exposure device 13. The opening portion corresponding to the process cartridge 80K for black (K) is constituted from first to fourth opening portions 220 to 223. The first to third opening portions 220 to 222 are provided at an end portion on one end side, an intermediate portion, and the rear end portion, respectively, of the guide surface 93 for the developing device 14. The fourth opening portion 223 is provided to extend along the longitudinal direction of the mount platform 92 for the exposure device 13.

Air is fed to the opening portions discussed above along the direction of arrangement of the four image preparing devices 10 (Y, M, C, K) from the image preparing device 10Y for yellow toward the image preparing device 10K for black. Therefore, the air flow which is blown by the front fan 110 has the highest flow velocity at the image preparing device 10Y for yellow, and has the lowest flow velocity at the image preparing device 10K for black. The air flow which passes through the image preparing device 10Y for yellow has the highest flow velocity. As illustrated in FIG. 20A, however, the air flow flows along the surface of the ventilation guiding member 200. Therefore, the air flow may pass by the opening portion 211 corresponding to the image preparing device 10Y for yellow if the unit mount member 90 is simply provided with the opening portion, and sufficient air may not be provided to the image preparing device 10Y for yellow.

Figure 22A:
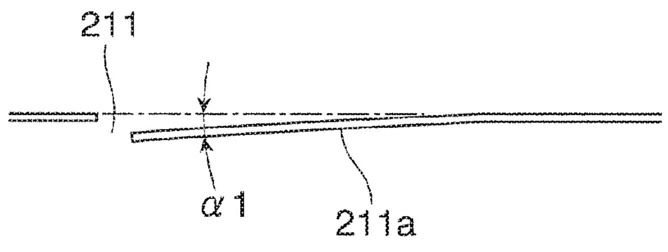
FIGS. 22A to 22D are each a sectional view illustrating the configuration of a particular portion of the unit mount member.

Thus, in the exemplary embodiment, as illustrated in FIG. 21, the first opening portion 211 for yellow is provided with a first introduction plate 211*a* provided in an inclined state. The first introduction plate 211*a* introduces the air flow which is blown by the front fan 110 into the first opening portion 211. As illustrated in FIG. 22A, the first introduction plate 211*a* is formed in the shape of a flat plate that is inclined downward on the first opening portion 211 side by a prescribed angle α1 with respect to the surface of the unit mount member 90. As illustrated in FIG. 21, a length L1 of the first introduction plate 211*a* for yellow along the mount direction of the process cartridge 80 is set to be the shortest since the air flow has the highest flow velocity. The inclination angle α1 of the first introduction plate 211*a* for yellow is the smallest of the angles of the other introduction plates. The first opening portion 211 for yellow only opens at an end portion on the upstream side along the mount direction of the process cartridge 80, and an opening portion for yellow is not provided on the downstream side along the mount direction unlike opening portions for the other image preparing devices.

Figure 22B:
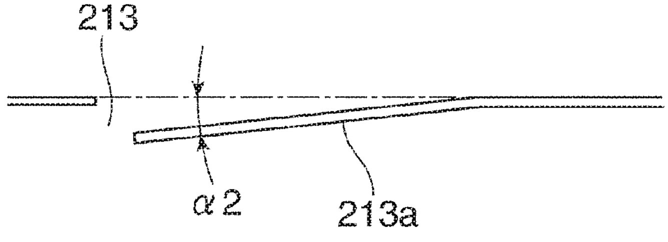

Meanwhile, the first opening portion 213 for magenta is provided with a first introduction plate 213*a* provided in an inclined state. The first introduction plate 213*a* introduces the air flow which is blown by the front fan 110 into the first opening portion 213. As illustrated in FIG. 22B, the first introduction plate 213*a* is formed in the shape of a flat plate that is inclined downward on the first opening portion 213 side by a prescribed angle α2 with respect to the surface of the unit mount member 90. As illustrated in FIG. 21, a length L2 of the first introduction plate 213*a* for magenta along the mount direction is set to be longer than that for the first opening portion 211 for yellow since the air flow for magenta has a flow velocity lower than that of the air flow for yellow. The inclination angle α2 of the first introduction plate 213*a* for magenta is larger than that of the first introduction plate 211*a* for yellow.

Figure 22C:
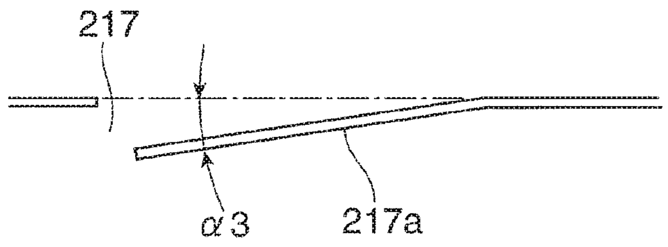

Further, the first opening portion 217 for cyan is provided with a first introduction plate 217*a* provided in an inclined state. The first introduction plate 217*a* introduces the air flow which is blown by the front fan 110 into the first opening portion 217. As illustrated in FIG. 22C, the first introduction plate 217*a* is formed in the shape of a flat plate that is inclined downward on the first opening portion 217 side by a prescribed angle α3 with respect to the surface of the unit mount member 90. The angle α3 is larger than that of the first introduction plate 211*a* for yellow. As illustrated in FIG. 21, a length L3 of the first introduction plate 217*a* for cyan along the mount direction is set to be longer than that for the first opening portion 211 for yellow and shorter than that for the first opening portion 213 for magenta since the air flow for cyan has a flow velocity lower than that of the air flow for yellow but the angle α3 is larger. The inclination angle α3 of the first introduction plate 217*a* for cyan is larger than that of the first introduction plate 213*a* for magenta.

Figure 22D:
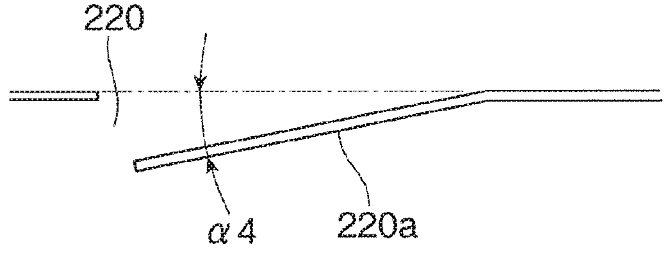

Meanwhile, the first opening portion 220 for black is provided with a first introduction plate 220*a* provided in an inclined state. The first introduction plate 220*a* introduces the air flow which is blown by the front fan 110 into the first opening portion 220. As illustrated in FIG. 22D, the first introduction plate 220*a* is formed in the shape of a flat plate that is inclined downward on the first opening portion 220 side by a prescribed angle α4 with respect to the surface of the unit mount member 90. As illustrated in FIG. 21, a length L4 of the first introduction plate 220*a* for black along the mount direction is set to be substantially as long as that for the first opening portion 213 for magenta since the air flow for black has the lowest flow velocity. The inclination angle α4 of the first introduction plate 220*a* for black is the largest.

As illustrated in FIG. 20A, in addition, the surface of the ventilation guiding member 200 is provided integrally with a first inclined surface 224, a second inclined surface 225, and a third inclined surface 226. The first and second inclined surfaces 224 and 225 feed air to the second opening portion 218 and the third opening portion 219 corresponding to cyan. The third inclined surface 226 feeds air to the second opening portion 221 corresponding to black. The second opening portion 218 and the third opening portion 219 corresponding to cyan are positioned on the upstream side along the flow direction of the air flow with respect to the second opening portion 221 corresponding to black. However, the second opening portion 221 corresponding to black is positioned on the most downstream side. Therefore, the air flow which has reached the side walls 208 flows into the second opening portion 221 to secure the flow amount of the air flow. In contrast, the second opening portion 218 and the third opening portion 219 corresponding to cyan are positioned at the third from the air feed side, and there is a limit to the effect obtained by increasing the inclination angle of the first introduction plate 217*a* to a degree. Therefore, the amount of air fed to the second opening portion 218 and the third opening portion 219 corresponding to cyan is secured by assistively providing the first and second inclined surfaces 224 and 225 on the surface of the ventilation guiding member 200. In order to secure the amount of air fed to the second opening portion 221 corresponding to black, the second opening portion 221 may be provided with an introduction plate 221*a* as illustrated in FIG. 7B.

In addition, the plural opening portions are basically set such that the opening width and the inclination angle are greater as the opening portion is farther from the front fan 110, and such that the opening area is larger as the opening portion is farther from the front fan 110.

Figure 23:
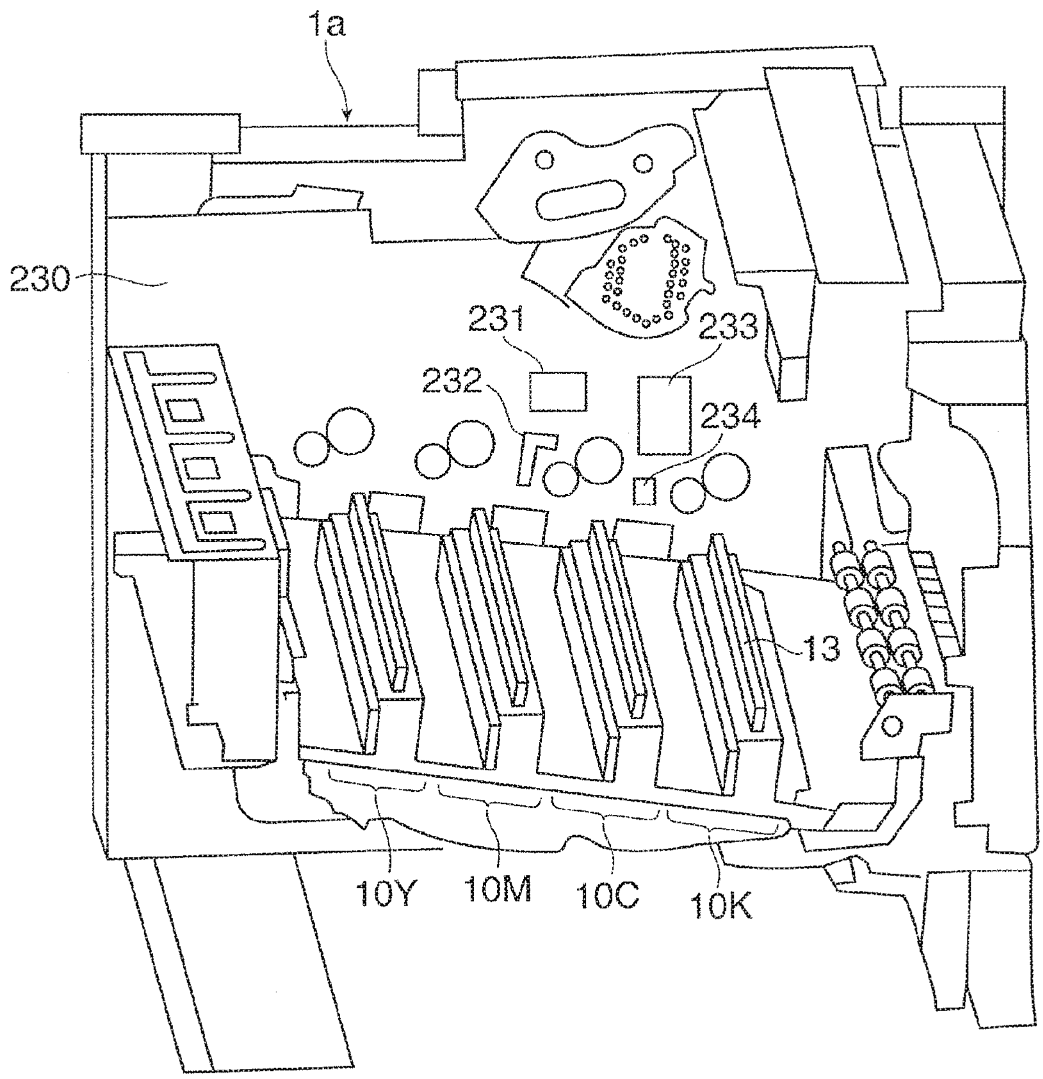
FIG. 23 illustrates the function of the image forming apparatus according to the first exemplary embodiment of the present invention.

As illustrated in FIG. 23, a side plate 230 is disposed on the left side surface 100*c* inside the apparatus body 1*a*. The side plate 230 is constituted of a metal sheet on the drive side to which the drive device 105 is mounted. As illustrated in FIG. 14, the drive device 105, the image processing device 106, the low-voltage power source device 107, the principal fan 111, and so forth are attached to the outer surface of the side plate 230. As illustrated in FIG. 23, four discharge ports 231 to 234 open in the side plate 230. The discharge ports 231 to 234 discharge a part of the air flow, which is fed from the front fan 110 to the image preparing devices 10 (Y, M, C, K) for yellow (Y), magenta (M), cyan (C), and black (K) via the unit mount member 90 and the ventilation guiding member 200 and fed from the waste toner recovery container 180 side of the image preparing devices 10 (Y, M, C, K) to the opposite side, to the outer surface of the side plate 230.

The four discharge ports 231 to 234 open at an end portion of the process cartridge 80C for cyan (C) on the back side along the mount direction, two on the upstream side and two on the downstream side of the process cartridge 80C for cyan (C). As illustrated in FIG. 11A, the air flow discharged from the discharge ports 231 to 234 is discharged to the outside from the first exhaust port 135 which opens in the left side surface 100*c* of the apparatus body 1*a*, for example.

<Operation of Specific Portion of Image Formation Apparatus>

In the image forming apparatus 1, as illustrated in FIG. 1, the front fan 110 and the principal fan 111 are driven along with the image forming operation of the image preparing devices 10 (Y, M, C, K) for yellow (Y), magenta (M), cyan (C), and black (K). The front fan 110 and the principal fan 111 may be driven in perfect synchronization with the image forming operation of the image preparing devices 10 (Y, M, C, K). It is desirable, however, that the front fan 110 and the principal fan 111 should be driven continuously for a prescribed time also after the image forming operation of the image preparing devices 10 (Y, M, C, K) is finished and be stopped after the prescribed time has elapsed.

Figure 24:
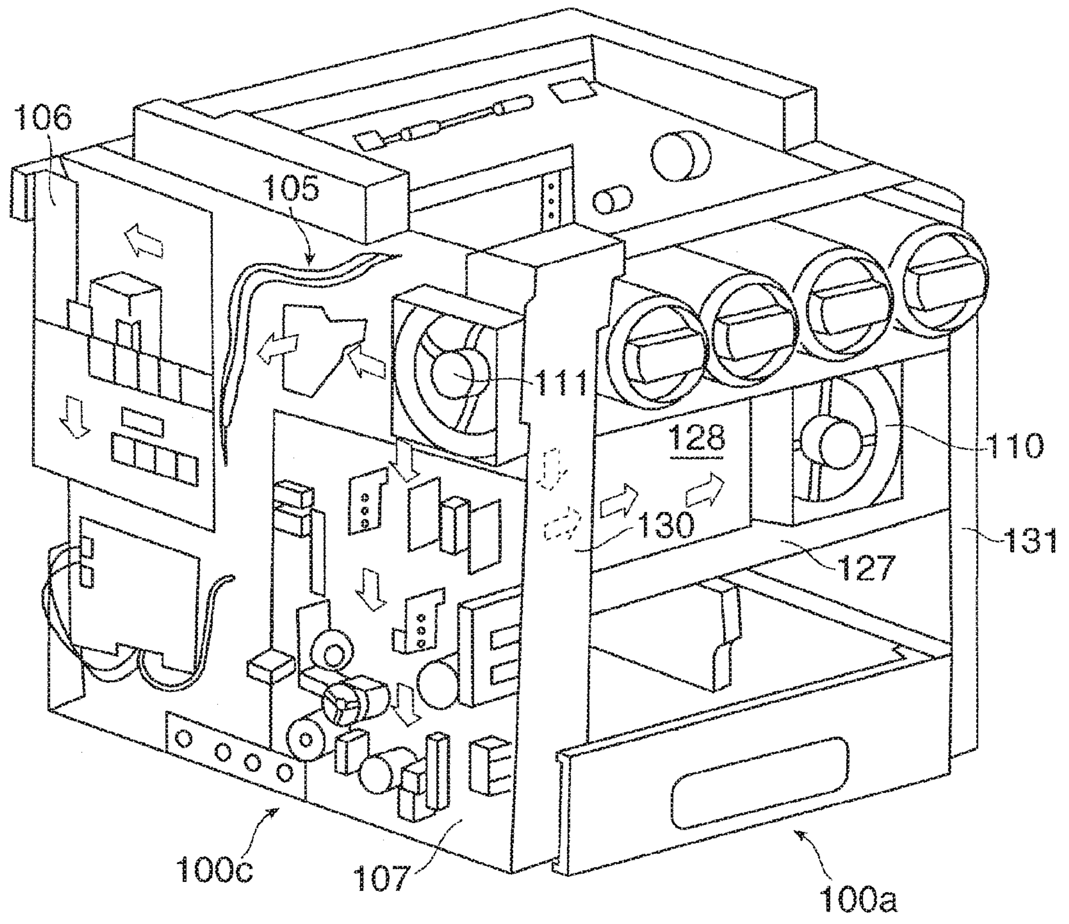
FIG. 24 illustrates the function of the image forming apparatus according to the first exemplary embodiment of the present invention.

As illustrated in FIG. 11A, when the principal fan 111 is driven, the principal fan 111 suctions outside air from the intake port 108 which is provided in the left side surface 100*c* of the apparatus body 1*a*. As illustrated in FIG. 24, the air flow which is blown by the principal fan 111 is branched by the first branch duct 120 (see FIG. 16), and fed to the image processing device 106 via the drive device 105 to cool the drive device 105 and the image processing device 106. As illustrated in FIG. 11A, the air flow which has cooled the drive device 105 and the image processing device 106 is discharged to the outside from the first exhaust port 135 which is provided in the left side surface 100*c* of the apparatus body 1*a*.

The air flow which has been branched by the first branch duct 120 is fed to the low-voltage power source device 107 to cool the low-voltage power source device 107. The air flow which has cooled the low-voltage power source device 107 is discharged to the outside from the second exhaust port 136 which is provided in the lower side surface 100*c* of the apparatus body 1*a*.

As illustrated in FIG. 24, the air flow which has been branched by the first branch duct 120 is fed to the front fan 110 through the duct 128 in the duct member 127. As illustrated in FIG. 15B, the front fan 110 suctions outside air via the gap G which is provided in the front surface of the apparatus body 1*a* and as the air which has been fed from the principal fan 111 via the duct 128 in the duct member 127. As illustrated in FIGS. 19A and 19B, the air flow which is blown by the front fan 110 is branched by the second branch duct 137 to be fed to spaces above and below the image forming portion which includes the image preparing devices 10 (Y, M, C, K) for yellow (Y), magenta (M), cyan (C), and black (K), the intermediate transfer device 20, and so forth.

Figure 25:
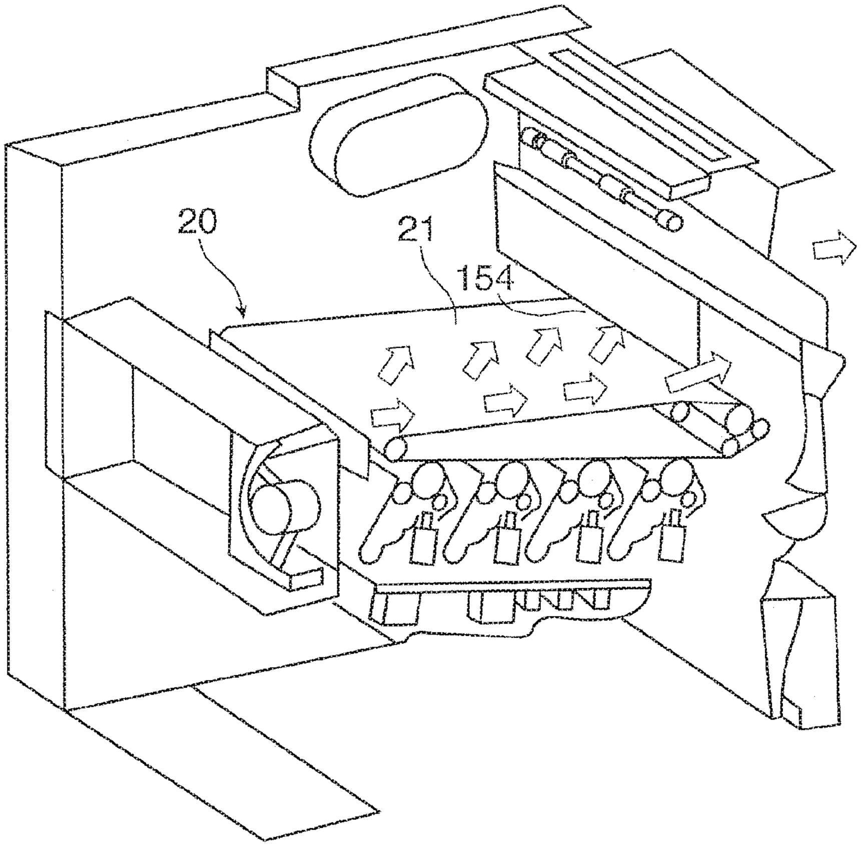
FIG. 25 illustrates the function of the image forming apparatus according to the first exemplary embodiment of the present invention.

As illustrated in FIG. 25, the air flow which has been fed to a space above the image forming portion which includes the image preparing devices 10 (Y, M, C, K) for yellow (Y), magenta (M), cyan (C), and black (K), the intermediate transfer device 20, and so forth flows along the upper surface of the intermediate transfer belt 21, and is fed to the back surface 100*d* side of the apparatus body 1*a* via the passage 154 which is formed between the intermediate transfer device 20 and the fixing device 40. As illustrated in FIG. 11A, the air flow which has been fed to the back surface 100*d* side of the apparatus body 1*a* is discharged to the outside from the third exhaust port 155 which is provided in the back surface 100*d* of the apparatus body 1*a*.

Figure 26:
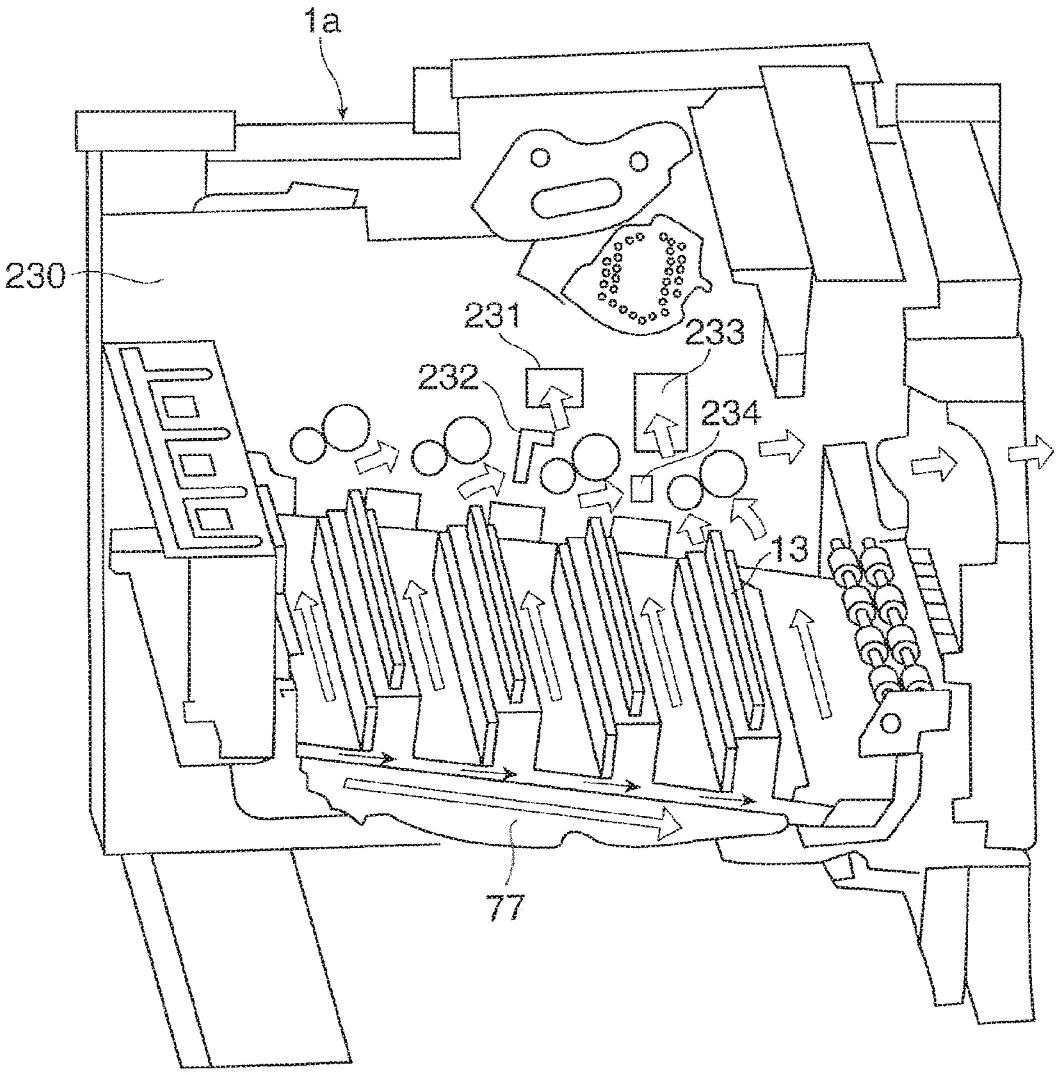
FIG. 26 illustrates the function of the image forming apparatus according to the first exemplary embodiment of the present invention.

As illustrated in FIG. 26, meanwhile, a part of the air flow which has been fed to a space below the image forming portion which includes the image preparing devices 10 (Y, M, C, K) for yellow (Y), magenta (M), cyan (C), and black (K), the intermediate transfer device 20, and so forth is fed to the high-voltage power source device 77 which is attached to the back surface of the ventilation guiding member 200 to cool the high-voltage power source device 77.

Further, another part of the air flow which has been fed to a space below the image forming portion which includes the image preparing devices 10 (Y, M, C, K) for yellow (Y), magenta (M), cyan (C), and black (K), the intermediate transfer device 20, and so forth flows to the ventilation passage 202 which is formed between the unit mount member 90 and the ventilation guiding member 200.

Figure 27:
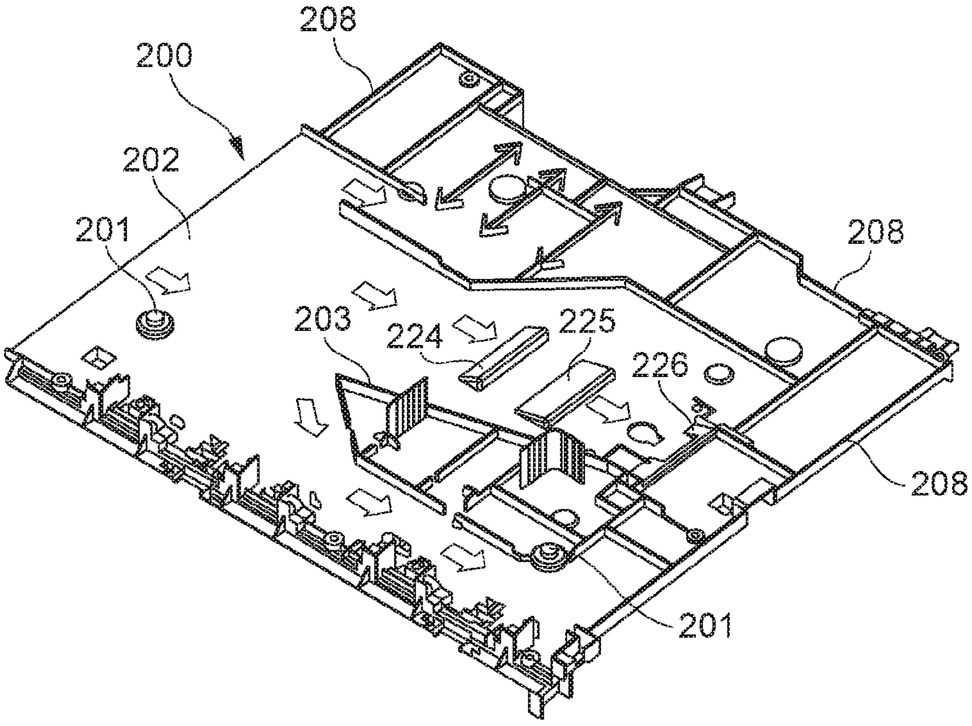
FIG. 27 illustrates the function of the image forming apparatus according to the first exemplary embodiment of the present invention.

As illustrated in FIG. 27, a part of the air flow which has flowed to the ventilation passage 202 which is formed between the unit mount member 90 and the ventilation guiding member 200 flows toward the front side of the unit mount member 90 along the mount direction of the process cartridge 80K. As illustrated in FIG. 21, the front side of the unit mount member 90 along the mount direction of the process cartridge 80K is provided with the plural first opening portions 211, 213, 217, and 220 through which air is fed to the image preparing devices 10 (Y, M, C, K) for yellow (Y), magenta (M), cyan (C), and black (K). As illustrated in FIGS. 22A to 22D, the plural first opening portions 211, 213, 217, and 220 are provided with the inclined plates 211*a*, 213*a*, 217*a*, and 220*a*, respectively. The opening widths of the first opening portions 211, 213, 217, and 220 for the image preparing devices 10 (Y, M, C, K) and the inclination angles $\alpha$1 to $\alpha$4 of the inclined plates 211*a*, 213*a*, 217*a*, and 220*a* are set such that the amounts of air that flows through the image preparing devices 10 (Y, M, C, K) for yellow (Y), magenta (M), cyan (C), and black (K) are substantially equal to each other. Therefore, on the front side of the unit mount member 90 along the mount direction of the process cartridge 80, as illustrated in FIG. 26, air flows that are substantially uniform at the image preparing devices 10 (Y, M, C, K) for yellow (Y), magenta (M), cyan (C), and black (K) are formed via the plural first opening portions 211, 213, 217, and 220 to flow along the surface of the unit mount member 90.

The unit mount member 90 is provided with plural opening portions that open at an intermediate portion and on the downstream side of the unit mount member 90 along the mount direction of the process cartridge 80. A part of the air flow which has flowed to the ventilation passage 202 which is formed between the unit mount member 90 and the ventilation guiding member 200 is fed to the image preparing devices 10 (Y, M, C, K) for yellow (Y), magenta (M), cyan (C), and black (K) from the plural opening portions 212, 214, 215, 216, 221, 222, and 223 which are provided at an intermediate portion and on the downstream side of the unit mount member 90 along the mount direction of the process cartridge 80.

In this event, as illustrated in FIG. 24, the front fan 110 is disposed at a position displaced toward the upstream side, along the mount direction of the process cartridge 80, with respect to the center line of the apparatus body 1*a* (to the right as seen from the front surface 100*a* of the apparatus body 1*a*). Therefore, the pressure of air blown by the front fan 110 is higher on the upstream side along the mount direction of the process cartridge 80 than on the downstream side. As a result, as illustrated in FIG. 26, the air flow which has been fed to the image preparing devices 10 (Y, M, C, K) from the plural first opening portions 211, 213, 217, and 220 and the other opening portions 212, 214, 215, 216, 221, 222, and 223 which are provided in the unit mount member 90 flows from the upstream side toward the downstream side along the mount direction of the process cartridge 80. A part of the air flow which has reached the downstream side along the mount direction of the process cartridge 80 flows from the four discharge ports 231 to 234 which open in the side plate 230 to the left side surface 100*c* of the apparatus body 1*a*, and is discharged to the outside from the first exhaust port 135 which is provided in the left side surface 100*c* of the apparatus body 1*a* as illustrated in FIG. 11B. In addition, a part of the air flow which has reached the downstream side along the mount direction of the process cartridge 80K is discharged to the outside from the third exhaust port 155 (see FIG. 11B) which is provided in the back surface 100*d* of the apparatus body 1*a*.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming portion;

a waste toner housing container disposed on one side surface of the image forming portion, wherein the waste toner housing container is configured to house waste toner discharged from the image forming portion;

an open/close member configured to open and close an opening provided in a side surface of an apparatus body, wherein the open/close member is configured for mounting, and removing the waste toner housing container; and an air blowing unit provided close to the waste toner housing container on a side surface of the apparatus body that is adjacent to the side surface on which the open/close member is provided, wherein the air blowing unit is configured to feed air to the image forming portion from a side of the waste toner housing container toward an opposite side, and wherein the air blowing unit include a branch member configured to separate an air flow to be fed to a space above the image forming portion and an air flow to be fed to a space below the image forming portion.

2. The image forming apparatus according to claim 1, wherein the image forming portion includes a plurality of image preparing units arranged along a direction determined in advance, and wherein the apparatus body includes a first guide member and a second guide member,
wherein the first guide member is configured to guide the air flow to be fed to the space below the image forming portion along a direction of arrangement of the plurality of image preparing units, and
wherein the second guide member is configured to guide the air flow which has been guided by the first guide member to the image preparing units from the side of the waste toner housing container toward the opposite side.

3. The image forming apparatus according to claim 2,
wherein the second guide member includes a plurality of openings through which air may be fed to the plurality of image preparing units, and
the plurality of openings have larger opening areas as a distance from the air blowing unit to the opening is longer.

4. The image forming apparatus according to claim 3,
wherein the plurality of openings include a plurality of introduction portions that introduce the air flow which has been guided by the first guide member to the openings, and
the plurality of introduction portions have longer lengths as a distance from the air blowing unit to the introduction portion is longer.

5. The image forming apparatus according to claim 2,
wherein the apparatus body includes a plate-like member made of a metal sheet and disposed opposite to the waste toner housing container, and
wherein the plate-like member includes a plurality of exhaust ports through which air fed from the air blowing unit toward the image forming portion is discharged.

6. An image forming apparatus comprising:
an image forming portion;
a waste toner housing container disposed on one side surface of the image forming portion,
wherein the waste toner housing container is configured to house waste toner discharge from the image forming portion;
an open/close member configured to open and close an opening provided in a side surface of an apparatus body,
wherein the open/close member is configured for mounting and removing the waste toner housing container; and
an air blowing unit provided close to the waste toner housing container on a side surface of the apparatus body that is adjacent to the side surface on which the open/close member is provided,
wherein the air blowing unit is configured to feed air to the image forming portion from a side of the waste toner housing container toward an opposite side,
wherein the apparatus body includes a first air blowing unit disposed on a front surface of the apparatus body and a second air blowing unit disposed on a left side surface of the apparatus body, and
wherein the image forming apparatus is configured such that a part of air fed by the second air blowing unit is for cooling a member disposed on the left side surface of the apparatus body, and another part of the fed air is for suctioning by the first air blowing unit.

7. The image forming apparatus according to claim 6,
wherein the second air blowing unit includes a branch duct that includes a first branch, a second branch, and a third branch,
wherein the first branch is configured to feed air which is fed by the second air blowing unit to a first object to be cooled,
wherein the second branch portion is configured to feed the fed air to a second object to be cooled, and
wherein the third branch portion is configured to feed the fed air to an intake portion of the first air blowing unit.

* * * * *